US008158895B2

(12) United States Patent
Grundtvig et al.

(10) Patent No.: US 8,158,895 B2
(45) Date of Patent: Apr. 17, 2012

(54) METHOD AND A SYSTEM FOR BATCHING OF OBJECTS

(75) Inventors: Henrik Grundtvig, Risskov (DK);
Henrik F. Skyum, Skanderborg (DK);
Bjorn Heide Pedersen, Randers (DK)

(73) Assignee: Scanvaegt International A/S, Aarhus N. (DK)

( * ) Notice: Subject to any disclaimer, the term of this patent is extended or adjusted under 35 U.S.C. 154(b) by 238 days.

(21) Appl. No.: 12/300,696

(22) PCT Filed: May 21, 2007

(86) PCT No.: PCT/DK2007/000237
§ 371 (c)(1),
(2), (4) Date: Nov. 13, 2008

(87) PCT Pub. No.: WO2007/134603
PCT Pub. Date: Nov. 29, 2007

(65) Prior Publication Data
US 2009/0145670 A1  Jun. 11, 2009

(30) Foreign Application Priority Data

May 19, 2006 (DK) .................. 2006 00698
Nov. 9, 2006 (DK) .................. 2006 01462
May 3, 2007 (DK) .................. 2007 00673

(51) Int. Cl.
G01G 13/00 (2006.01)
B07C 5/16 (2006.01)
(52) U.S. Cl. ........ 177/145; 414/800; 198/382; 209/542; 209/592; 209/645

(58) Field of Classification Search .................. 198/382; 414/800; 209/542, 592, 645; 177/145; 901/50
See application file for complete search history.

(56) References Cited

U.S. PATENT DOCUMENTS 4,239,434 A * 12/1980 Gannon ..................... 198/349.8
5,178,225 A    1/1993 Anderson et al.
5,456,561 A * 10/1995 Poduje et al. .............. 414/744.5
6,073,667 A *  6/2000 Graffin ......................... 141/372
(Continued)

FOREIGN PATENT DOCUMENTS
EP    0781172 B1    7/1997
(Continued)

OTHER PUBLICATIONS

Khodabandehloo, Benefits of Expert Robots: Intelligence vs Skill, 1991, NATO ASI, Series F(Computer & Systems Sciences), vol. F71, pp. 673-697.

(Continued)

Primary Examiner — Randy W Gibson
(74) Attorney, Agent, or Firm — Pearne & Gordon LLP

(57) ABSTRACT

The invention relates to a method and a system for batching of supplied objects in batches in such a manner that a batch fulfills predefined criteria as regards for example the total weight range and optionally the number of objects, weight, orientation and/or type(s) of objects. A selective transferal of the objects from means for object transport to batching means is performed by means of one or more handling means of the robot type in as a batch of objects is produced in consideration of said predefined criteria. The batches are produced on said batching means that are moved around said one or more handling means of the robot type.

23 Claims, 10 Drawing Sheets

U.S. PATENT DOCUMENTS

Figure 1:
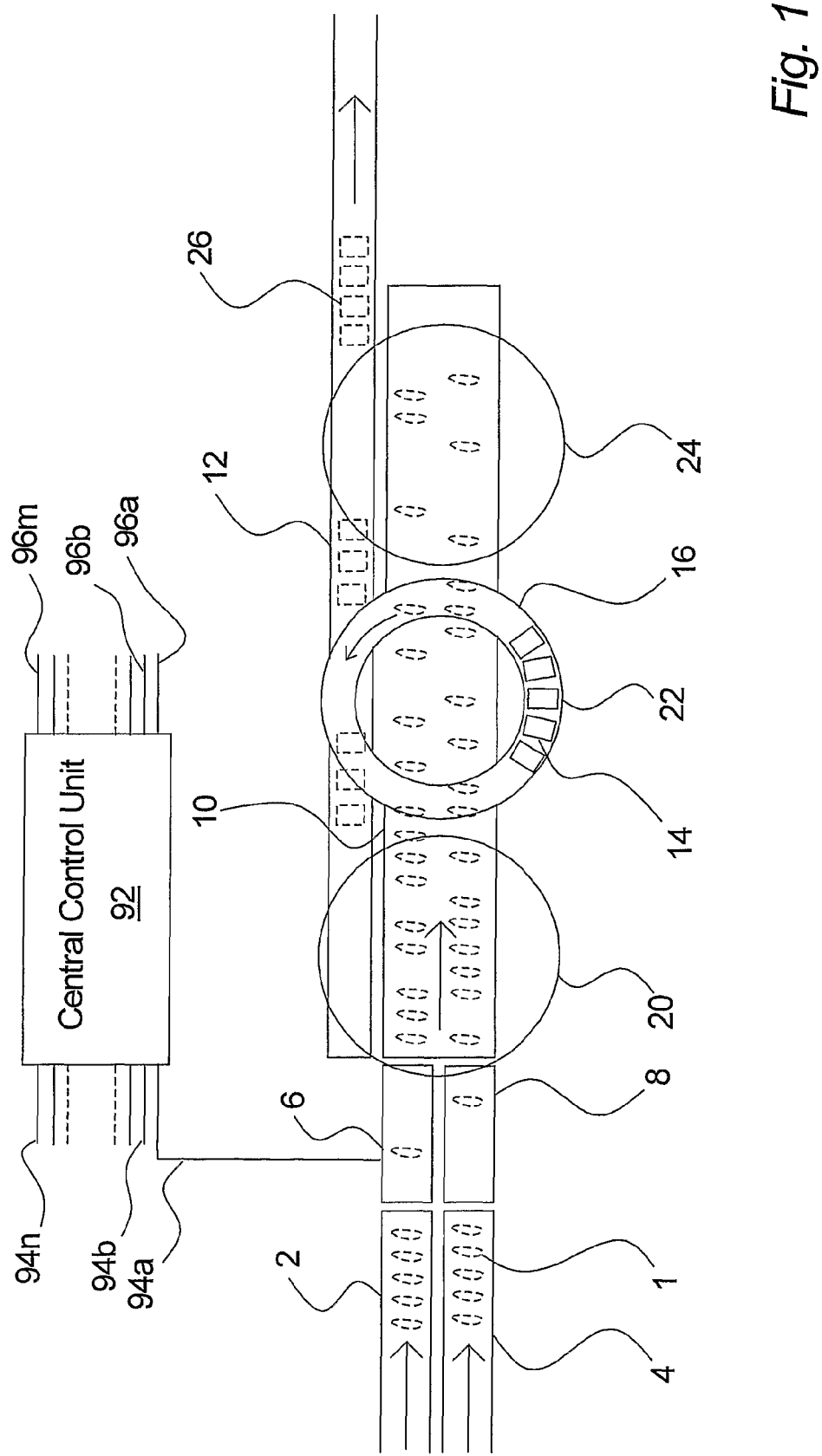

| | | | |
|---|---|---|---|
| 6,122,895 A * | 9/2000 | Schubert | 53/55 |
| 6,151,866 A * | 11/2000 | Connell | 53/443 |
| 6,262,377 B1 * | 7/2001 | Nielsen et al. | 177/1 |
| 6,374,984 B1 * | 4/2002 | Nagler | 198/382 |
| 6,533,125 B1 * | 3/2003 | Jensen | 209/592 |
| 6,536,599 B1 * | 3/2003 | Nielsen | 209/540 |
| 6,712,221 B2 * | 3/2004 | Kvisgaard et al. | 209/645 |
| 6,881,907 B2 * | 4/2005 | Winkelmolen | 177/145 |
| 6,978,882 B2 * | 12/2005 | Nagler | 198/750.11 |
| 7,004,331 B2 * | 2/2006 | Tew et al. | 209/645 |
| 7,201,553 B2 * | 4/2007 | Spatafora | 414/729 |
| 7,258,237 B2 * | 8/2007 | Nielsen | 209/645 |
| 7,336,585 B2 * | 2/2008 | Kumasaka et al. | 369/101 |
| 7,775,373 B2 * | 8/2010 | Grundtvig et al. | 209/542 |
| 2003/0123971 A1 * | 7/2003 | Koyama et al. | 414/935 |
| 2008/0075561 A1 * | 3/2008 | Takemura et al. | 414/2 |
| 2008/0240889 A1 * | 10/2008 | Yokoyama | 414/1 |
| 2008/0253876 A1 * | 10/2008 | Sandmeier | 414/744.3 |
| 2010/0209225 A1 * | 8/2010 | Matsuo et al. | 414/744.5 |
| 2010/0215473 A1 * | 8/2010 | Pedersen | 414/800 |
| 2010/0217436 A1 * | 8/2010 | Jones et al. | 700/245 |
| 2010/0290886 A1 * | 11/2010 | Hashimoto et al. | 414/800 |

FOREIGN PATENT DOCUMENTS

| | | |
|---|---|---|
| GB | 1471514 A | 4/1977 |
| GB | 2116732 A | 9/1983 |
| WO | 95/35238 A1 | 12/1995 |
| WO | 00/23771 A1 | 4/2000 |
| WO | 01/22043 A2 | 3/2001 |
| WO | 2005/106405 A1 | 11/2005 |

OTHER PUBLICATIONS

Khodabandehloo, Robotic Packaging of Poultry Products, 1993, Robotics in Meat, Fish and Poultry Processing, ed. Khodabandehloo, Chapter 4, pp. 70-97.

International Search Report for PCT/DK2007/000237, Jul. 23, 2007.

* cited by examiner

METHOD AND A SYSTEM FOR BATCHING OF OBJECTS

FIELD OF THE INVENTION

The invention relates to a method and a system for batching of supplied objects in batches in such a manner that a batch fulfills predefined criteria as regards for example the total weight range and optionally the number of objects, weight, orientation and/or type(s) of objects and wherein use is made of handling means of the robot type.

BACKGROUND OF THE INVENTION

Batching of objects such as for example food product in order to produce batches that for example fulfil predefined criteria as regards e.g. the total weight are well-known within the prior art, cf. for example GB 2 116 732 and EP 781 172 and WO 00/23771 that describe systems, wherein the food items are transported on a conveyor belt and wherein the items are selectively transferred to a plurality of receiver stations, where the batches are formed.

Further, the use of a robot in connection with batching of objects such as foodstuff items has also been suggested in connection with prior art systems.

For example, WO 95/35238 A discloses a method and a system for forming weighed batches of foodstuff articles wherein a robot is used for transferring selected foodstuff items to a carrier plate. However, according to this prior art, the robot and the system is arranged in such a manner that the robot picks up the items one by one and delivers the items to the carrier plate. Thus, the robot is only able to deposit the transferred items to a single location placed in the vicinity of the robot and in the same order as the items are forwarded to the robot.

Further, in "BENEFITS OF EXPERT ROBOTS: INTELLIGENCE vs. SKILL" by K. Khodabandehloo ("Expert Systems and Robotics", Springer-Verlag Berlin Heidelberg, 1991) and in "Robotic packaging of poultry products", also by K. Khodabandehloo ("Robotics in Meat, Fish and Poultry Processing", Routledge, 1992), the use of a single robot in a batching system has been suggested. These two documents both suggest an application for a robotic system for fixed-weight-fixed-price packaging of fresh portions of poultry and in particular chicken. Chicken portions, e.g. chicken breasts, are mechanically weighed and the weight information is transmitted to a computer controlling the robotic cell. The computer controls the robot in such a manner that a predefined number of portions having (at least) a predefined total weight (and with a minimum excess weight) are assembled on a tray. Cameras are used for detecting the position of the individual portions, e.g. in order to aid the robot in gripping the items.

Still further, in WO 01/22043 the use of robot technique for effecting the transfer of items to selected receiving stations, where the batches are formed, is disclosed.

Also, WO 2005/106405 describes the use of moving means of the robot type for moving food products to portion carriers, where the food products are supplied by means of a conveyor and selectively moved to portion carriers on a portion carrier that runs in parallel with the food product conveyor.

It is an object of the present invention to present a method and a system for batching of objects, which provides a more flexible and efficient batching in comparison with the above-mentioned prior art.

Thus, it is an object of the present invention to present such a method and such a system, by means of which a more effective handling of the produced batches or packages can be provided.

Further, it is an object of the present invention to present such a method and such a system, by means of which the selected objects for a batch can be placed in e.g. predetermined and/or orderly form, and whereby the produced batches may be processed further, e.g. packaged etc. without disturbing or interfering with the form or "layout" of the produced batches.

In particular, it is an object of the invention to provide such a method and such an apparatus, which is suitable for selecting and placing objects, which "belong together in an assembly" on a desired packaging, tray etc. Such objects that may be said to "belong together in an assembly" may for example be objects that together has a predefined mass or weight (for example 1 kg), but other criteria may also be used. Such an example may for example be a package comprising chicken parts, e.g. prepared and ready for putting in the oven, where a package comprises two chicken thighs, two chicken legs ("drumsticks"), two chicken wings and two chicken breast parts.

Further, it is an object of the present invention to provide such a method and such an apparatus, which provides improvements in relation to the prior art systems as regards the speed with which a flow of objects may be transferred to batches or packages, while simultaneously providing the effect that the objects may be placed in the batches or packages in an orderly form.

Still further, it is an object of the present invention to provide such a method and such an apparatus, by means of which an effective handling of different batches or packages, e.g. batches having different target weights, is facilitated.

These and other objects are achieved by the invention as explained in further detail in the following.

THE INVENTION

The invention relates to a method of batching supplied objects in batches in such a manner that a batch fulfills predefined criteria, e.g. as regards the total weight range and optionally the number of objects, weight, orientation and/or type(s) of objects, wherein
  the weight of each object is determined
  the objects are transported by means for object transport,
  a selective transferal of the objects from said means for object transport to batching means is performed by means of one or more handling means of the robot type in as a batch of objects is produced in consideration of said predefined criteria,
and wherein
said batches of objects are produced on batching means that are moved around said one or more handling means of the robot type.

Hereby, a number of advantages are achieved. The efficiency of the batching operation is enhanced since the objects can be transferred in such a manner that the effective transfer time can be reduced in comparison with prior art methods and systems. While the batching means are moved around the handling means of the robot type, the distance from the pick-up area can remain within a predefined limit, and the handling means of the robot type need only move from the pick-up area to the batching means that are constantly located within the predetermined area in contrast to prior art systems and methods where the batching means are moving rectilinearly alongside the object transportation, meaning that the handlings means may have to move a relatively long distance, for example when picking up an object that has entered the pick-up area, and moving it to a batching means that is at the far end of the effective delivery area.

Furthermore, further efficiency can be achieved when the orientation of the objects are a matter of concern, for example when the objects have a distinct shape and has to be placed on the batching means with a predetermined orientation and/or with a predefined orientation in relation to other objects. In such instances the handling means can be controlled to pick-up or grip a selected object when a suitable orientational relationship exist between the object and the intended batching means (that circle around the handling means), whereby the handling means need not turn the object or need only turn the object a small angle. Thereby, the time and resources needed to turn e.g. the gripping means of the robot is avoided or at least minimized.

Preferably, said batching means may be arranged in such a manner that a number of batching means move around each of said one or more handling means of the robot type.

Hereby, a relatively simple configuration can be achieved.

Advantageously, said batching means may be trays or similar means.

According to a preferable embodiment, said batching means may be arranged on a carrier, e.g. a carrier designated for each of said one or more handling means of the robot type, which carrier(s) is/are designed for carrying said batching means.

Preferably, said carrier may be arranged for turning said batching means in a closed loop, e.g. a circle, while the batches are being produced.

Hereby, it is achieved that a batch need not necessarily be completed within e.g. a predetermined time limit corresponding to the transport time once around the handling means of the robot type, but that a batch that can be completed in an optimal manner, e.g. with a minimum of give-away, if it is allowed to remain in the loop, and the system can do so without having to perform any further operations or actions.

Advantageously, a batching means can be moved around said one or more handling means of the robot type for more than one revolution, while a batch of objects is produced on said batching means.

Hereby, it is achieved that there are no restraints on the time, in which a particular batch must be completed, i.e. since a tray may be allowed to remain in the circuit or loop around the robot as long as necessary in order to wait for one or more suitable objects to emerge, that will complete the batch in an optimal manner, e.g. with a minimum of give-away weight.

According to a preferable embodiment, said carrier may comprise a number of carrier segments and such segments may be exchanged, for example when is it desired to use batching means of a different size and/or type.

Thereby, a change of tray size, e.g. corresponding to a change of batch size and/or object size, may be effected relatively easily by exchanging the segments with segments dedicated to the desired size instead of having to perform modifications to the carrier or instead of having to exchange the complete carrier. Furthermore, when using carrier segments, a carrier can easily be modified to comprise different batch sizes and the number of batches of each size allocated to a carrier can easily be adjusted.

In this respect it is noted that such a segment can comprise only one location or compartment for a batching means, e.g. a tray. But it will also be understood that two, three or more can be comprised. Furthermore, it will be understood that at one and the same carrier different sizes of batching means can be used, e.g. for batching different batches (e.g. batches of different sizes and/or types). It will naturally also be possible to have only one type and/or size of batching means at one and the same carrier.

Advantageously, said carrier may be designed for retaining said batching means, e.g. trays, when said carrier is moving.

Hereby, it is achieved that the batching means are held in a secure and precise manner, when the carrier means are moved.

According to an advantageous embodiment, said carrier may comprise retaining means that are releasable, for example by means of a release mechanism, when a tray is placed on the carrier or when a completed batch is removed.

Hereby, it is achieved that the batching means can be transferred from the carrier means with relatively ease when a batch has been completed.

According to a particular preferable embodiment, said carrier may be designed for covering edge parts of said batching means, e.g. trays, when said batches of objects are produced.

Hereby, it is achieved that the edges of the batching means, e.g. the tray will be covered during the batching, which is of importance in a number of applications and in particular when batching of foodstuff or similar items is concerned. Since these items may have a moist or wet surface, the edges of the batching means, e.g. the tray may be moistened as well or otherwise contaminated, if the edges are not covered and if the objects contact the edges during the batching. Further, during the handling of the objects, particles, fibres, fat, moist, e.g. drops, etc. may fall from the objects down on the edges of the batching means, if these are not covered, thereby also resulting in a possible moistening and/or contamination of the edges. This is in many instances undesirable, for example when the batching means, e.g. the trays are packaged using lids, foil or the like that are connected to the edge parts of the batching means, e.g. the tray, for example by welding, gluing, moulding etc., since the moist, fat, etc. may result in a less than optimal packaging. Thus, by this embodiment of the invention, an improved packaging process can also be achieved.

According to a preferable embodiment, a batching means may be transferred, when completed, to means for further transport, handling, packaging etc.

Such a transfer may be facilitated in numerous manners, for example by using an arm or the like for pushing or pulling the completed batch away from the carrier means, when the batching means in question is positioned aligned with the transfer means and for example a take-away conveyor.

Advantageously, a completed batch may be transferred from e.g. said carrier, possibly via an intermediate position, downwards via e.g. a chute to said means for further transport, handling, packaging etc.

Hereby, a compact arrangement is achieved.

According to an advantageous embodiment, an empty batching means may be transferred to e.g. said carrier after a completed batch has been removed.

Hereby, an enhanced efficiency is achieved in particular if an empty batching means is transferred to the carrier relatively quickly after the completed batch has been removed, thereby allowing the batching to take place using a maximum of batching means and thereby enhancing the options for selectively placing a particular object.

According to a further advantageous embodiment, empty batching means may be dispensed from a supply of batching means, optionally via a buffer zone.

Preferably, objects may be supplied in one or more rows on said means for object transport towards said one or more handling means of the robot type.

Advantageously, a pick-up area for each of said one or more handling means of the robot type may be defined by the robot and/or the moving batching means.

Advantageously, said batching may be performed under control of e.g. a central control system.

In this respect it is noted that such a central control system will receive input as regards the individual items, e.g. their weight, position, colour, shape etc. and that the central control system will keep track of these items as well as the batching means, e.g. the location in the individual carrier means, the batches, to which the objects are transferred, data concerning the individual batches, the further transport and location of the completed batches etc.

Preferably, a plurality, e.g. two, three or more robots may be used, and batches of different sizes and/or types can be completed at each of said robots, respectively.

Advantageously, said batching means may be continuously moved around said one or more handling means of the robot type during the batching process, said batching means may be moved non-continuously, e.g. step by step, around said one or more handling means of the robot type during the batching process.

According to a particular preferable embodiment, batching means, e.g. trays, etc., may be supplied using a method comprising the steps of feeding a batching means to an initial position from a supply of batching means, transferring said batching means from said initial position to an operative position using ejector means, and returning said ejector means to a waiting position whereby a subsequently released batching means enters said initial position.

Hereby, it is achieved that batching means, e.g. trays can be supplied using a compact arrangement and in such a manner that the e.g., tray is readily positioned. Furthermore, an efficient and quick dispensing is achieved.

Advantageously, said subsequently released batching means may be released from said supply either while said transferring of said batching means from said initial position to an operative position is performed or while said ejector means are returned to said waiting position.

Preferably, said subsequently released batching means may be supported by at least part of said ejector means during at least part of said transfer operation.

Advantageously, said ejector means may operate in a reciprocating manner.

The invention further relates to a system for batching supplied objects in batches in such a manner that a batch fulfills predefined criteria, e.g. as regards the total weight range and optionally the number of objects, weight, orientation and/or type(s) of objects, wherein the system comprises means for determining the weight of each object means for object transport, batching means, one or more handling means of the robot type for effecting a selective transferal of the objects from said means for object transport to said batching means in as a batch of objects is produced in consideration of said predefined criteria, and wherein said batches of objects are produced on said batching means that are moved around said one or more handling means of the robot type.

Hereby, a number of advantages are achieved. The efficiency of the batching system is enhanced since the objects can be transferred in such a manner that the effective transfer time can be reduced in comparison with prior art methods and systems.

While the batching means are moved around the handling means of the robot type, the distance from the pick-up area can remain within a predefined limit, and the handling means of the robot type need only move from the pick-up area to the batching means that are constantly located within the predetermined area in contrast to prior art systems and methods where the batching means are moving rectilinearly alongside the object transportation, meaning that the handlings means may have to move a relatively long distance, for example when picking up an object that has entered the pick-up area, and moving it to a batching means that is at the far end of the effective delivery area.

Preferably, said batching means may be arranged in such a manner that a number of batching means move around each of said one or more handling means of the robot type.

Hereby, a relatively simple design of the system is achieved.

Advantageously, said batching means may be trays or similar means.

According to a preferable embodiment, said batching means may be arranged on a carrier, e.g. a carrier designated for each of said one or more handling means of the robot type, which carrier(s) is/are designed for carrying said batching means.

Advantageously, said carrier may be arranged for turning said batching means in a closed loop, e.g. a circle, while the batches are being produced.

Hereby, it is achieved that a batch need not necessarily be completed within e.g. a predetermined time limit corresponding to the transport time once around the handling means of the robot type, but that a batch that can be completed in an optimal manner, e.g. with a minimum of give-away, if it is allowed to remain in the loop, and the system can do so without having to perform any further operations or actions.

Advantageously, said system may be configured for moving a batching means around said one or more handling means of the robot type for more than one revolution, while a batch of objects is produced on said batching means.

Hereby, it is achieved that there are no restraints on the time, in which a particular batch must be completed, i.e. since a tray may be allowed to remain in the circuit or loop around the robot as long as necessary in order to wait for one or more suitable objects to emerge, that will complete the batch in an optimal manner, e.g. with a minimum of give-away weight.

According to a particular preferable embodiment, said carrier may comprise a number of carrier segments and such segments may be exchanged, for example when is it desired to use batching means of a different size and/or type.

Thereby, a change of tray size, e.g. corresponding to a change of batch size and/or object size, may be effected relatively easily by exchanging the segments with segments dedicated to the desired size instead of having to perform modifications to the carrier or instead of having to exchange the complete carrier. Furthermore, when using carrier segments, a carrier can easily be modified to comprise different batch sizes and the number of batches of each size allocated to a carrier can easily be adjusted.

In this respect it is noted that such a segment can comprise only one location or compartment for a batching means, e.g. a tray. But it will also be understood that two, three or more can be comprised. Furthermore, it will be understood that at one and the same carrier different sizes of batching means can be used, e.g. for batching different batches (e.g. batches of different sizes and/or types). It will naturally also be possible to have only one type and/or size of batching means at one and the same carrier.

Advantageously, said carrier may comprise means for retaining said batching means e.g. trays, for example in the form of a retainer arm, that may be influenced by spring means.

Hereby, it is achieved that the batching means are held in a secure and precise manner, when the carrier means are moved.

Advantageously, means for retaining said batching means, e.g. trays, for example in the form of a retainer arm, may comprise a release mechanism.

Hereby, it is achieved that the batching means can be transferred from the carrier means with relatively ease when a batch has been completed.

According to a particular preferable embodiment, said carrier may comprise means for covering edge parts of said batching means, e.g. trays, for example in the form of rim parts of a plate part.

Hereby, it is achieved that the edges of the batching means, e.g. the tray will be covered during the batching, which is of importance in a number of applications and in particular when batching of foodstuff or similar items is concerned. Since these items may have a moist or wet surface, the edges of the batching means, e.g. the tray may be moistened as well or otherwise contaminated, if the edges are not covered and if the objects contact the edges during the batching. Further, during the handling of the objects, particles, fibres, fat, moist, e.g. drops, etc. may fall from the objects down on the edges of the batching means, if these are not covered, thereby also resulting in a possible moistening and/or contamination of the edges. This is in many instances undesirable, for example when the batching means, e.g. the trays are packaged using lids, foil or the like that are connected to the edge parts of the batching means, e.g. the tray, for example by welding, gluing, moulding etc., since the moist, fat, etc. may result in a less than optimal packaging. Thus, when using this embodiment of the invention, an improved packaging process can also be achieved.

Preferably, said system may be designed for transferring a batching means, when completed, to means for further transport, handling, packaging etc.

Such a transfer arrangement can be designed in numerous manners, for example comprising an arm or the like for pushing or pulling the completed batch away from the carrier means, when the batching means in question is positioned aligned with the transfer means and for example a take-away conveyor.

Advantageously, a completed batch may be transferred from e.g. said carrier, possibly via an intermediate position, downwards via e.g. a chute to said means for further transport, handling, packaging etc.

Preferably, said system may be designed for transferring an empty batching means to e.g. said carrier after a completed batch has been removed.

Hereby, an enhanced efficiency is achieved in particular if an empty batching means is transferred to the carrier relatively quickly after the completed batch has been removed, thereby allowing the batching to take place using a maximum number of batching means and thereby enhancing the options for selectively placing a particular object.

According to a further preferable embodiment, said system may comprise a supply of batching means and that empty batching means are dispensed from said supply, optionally via a buffer zone to the carrier.

Preferably, objects may be supplied in one or more rows on said means for object transport towards said one or more handling means of the robot type.

Advantageously, a pick-up area for each of said one or more handling means of the robot type may be defined by the robot and/or the moving batching means.

Preferably, said system may comprise control means, e.g. a central control system for controlling said batching.

Advantageously, said system may comprise a plurality, e.g. two, three or more robots, and where batches of different sizes and/or types can be completed at each of said robots, respectively.

Advantageously, said batching means may be continuously moved around said one or more handling means of the robot type during the batching process, said batching means may be moved non-continuously, e.g. step by step, around said one or more handling means of the robot type during the batching process.

According to a particular preferable embodiment, said system may comprise an apparatus for dispensing batching means, e.g. trays, etc., said apparatus comprising a supply of said batching means and ejector means, wherein said ejector means are designed for transferring a batching means from an initial position to an operative position, and wherein said apparatus is designed for feeding a batching means to said initial position from said supply.

Hereby, it is achieved that batching means, e.g. trays can be supplied using a compact arrangement and in such a manner that the e.g. tray is readily positioned. Furthermore, an efficient and quick dispensing is achieved.

Preferably, said initial position may be located below said supply of said batching means.

Advantageously, said ejector means may be designed for operating in a reciprocating manner.

Preferably, at least part of said ejector means may be designed for passing below said supply, when transferring a batching means from an initial position to an operative position.

Advantageously, said apparatus may be designed for releasing a batching means from said supply either in connection with the transfer of a batching means from an initial position to an operative position or after said transfer has taken place.

Preferably, said apparatus may comprise a release mechanism for individually releasing said batching means from said supply.

In accordance with a still further aspect, the invention also relates to an apparatus for dispensing and positioning/placing/pushing packing or supporting elements, e.g. trays, etc., in general and a method of dispensing and positioning such packing or supporting elements, e.g. trays, etc.

THE FIGURES

Figure 2:
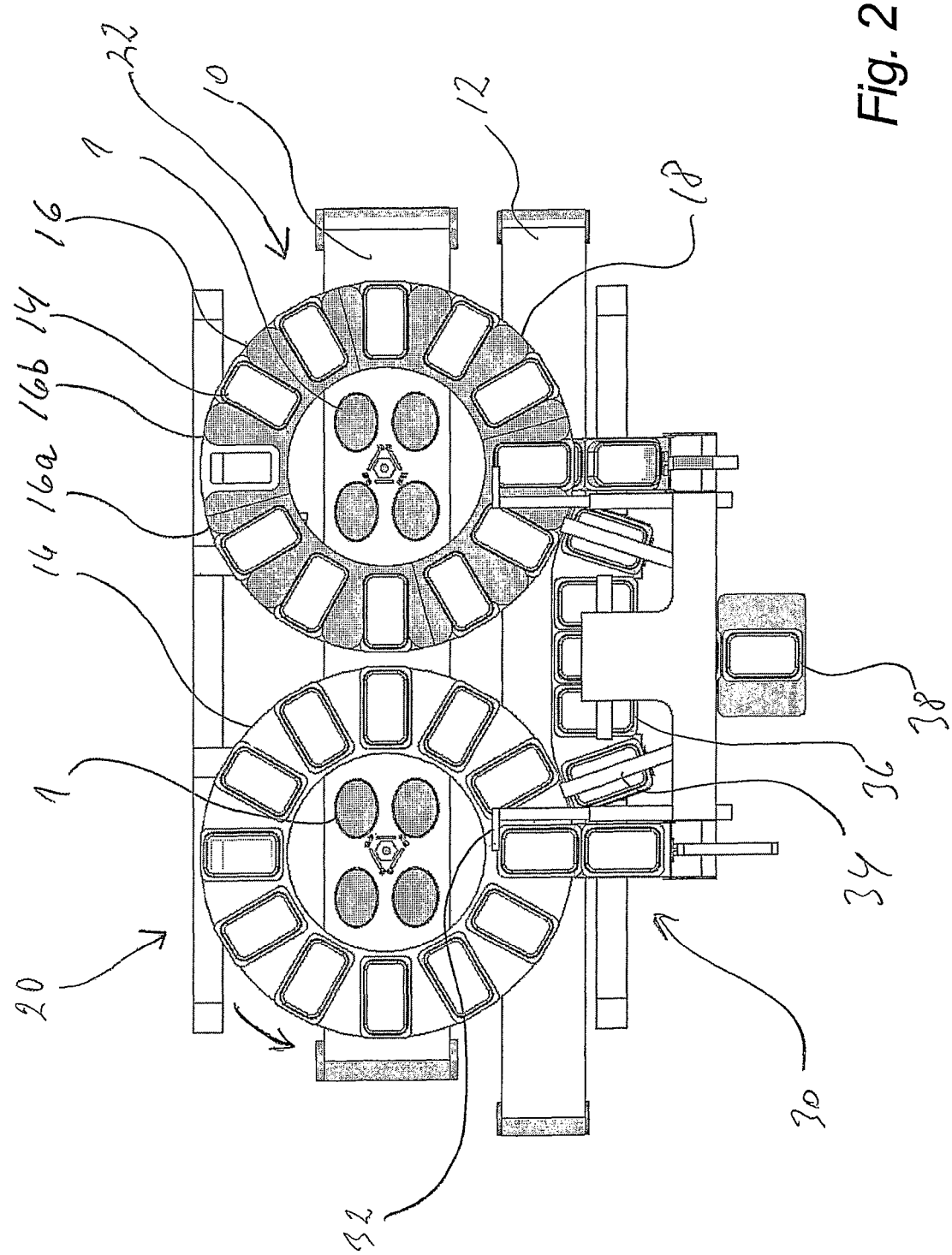
Figure 3:
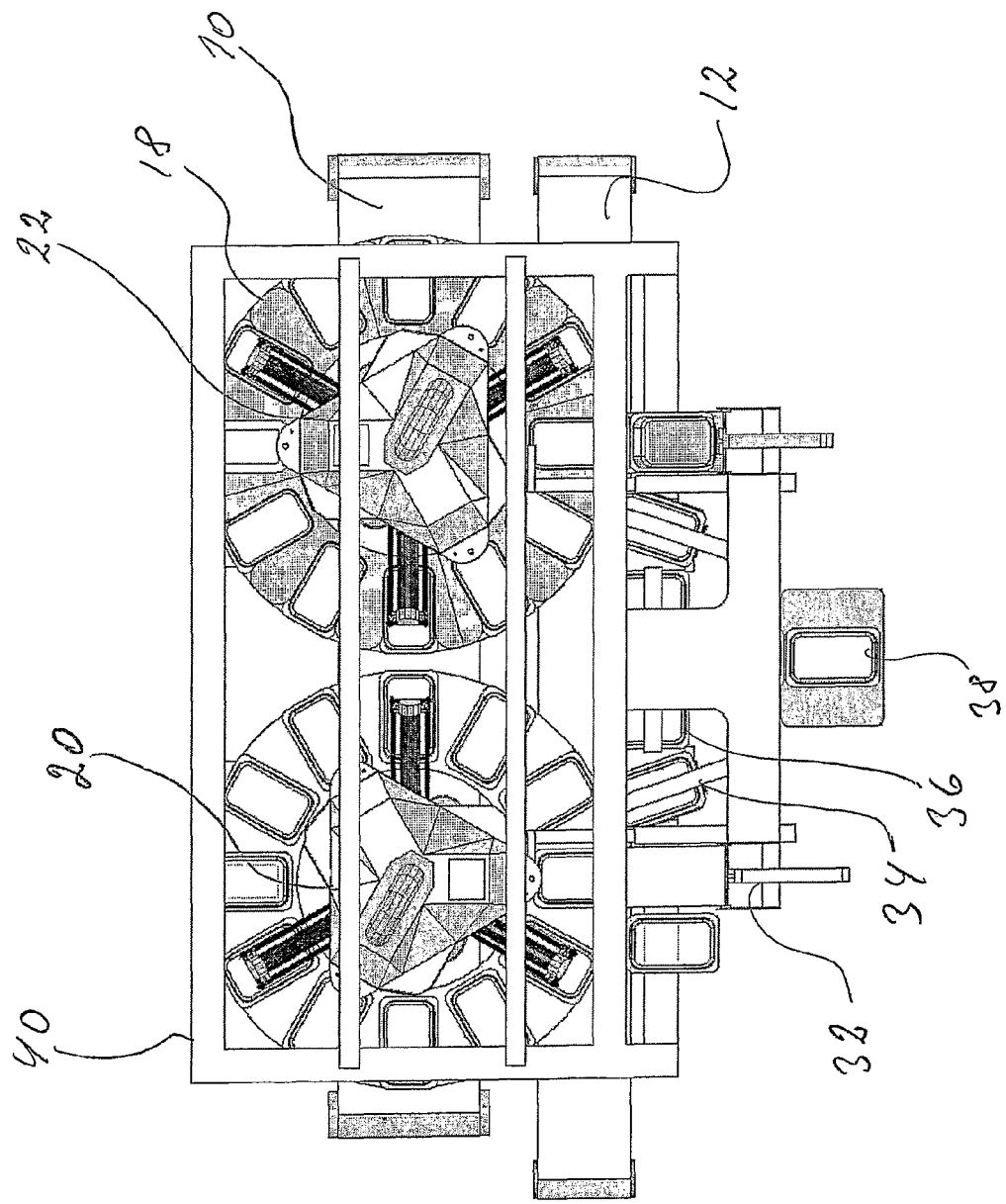
Figure 4:
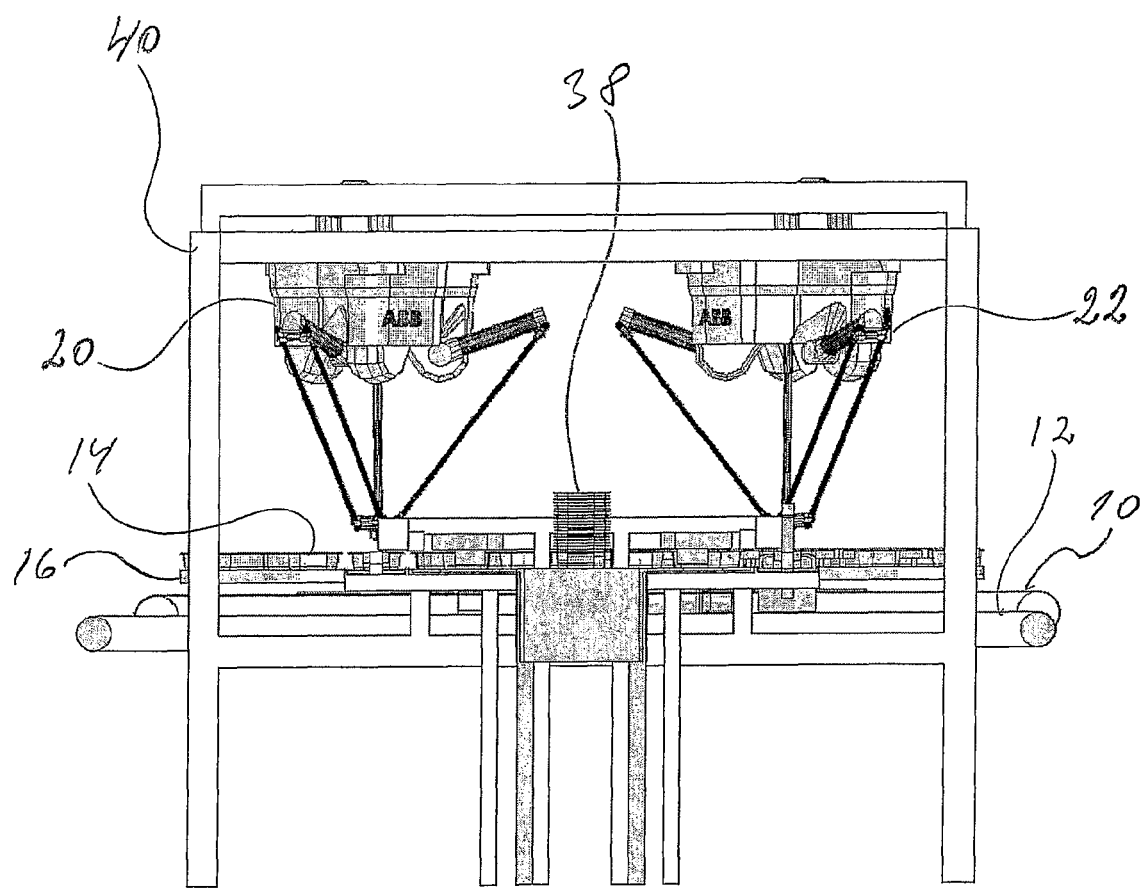
Figure 5:
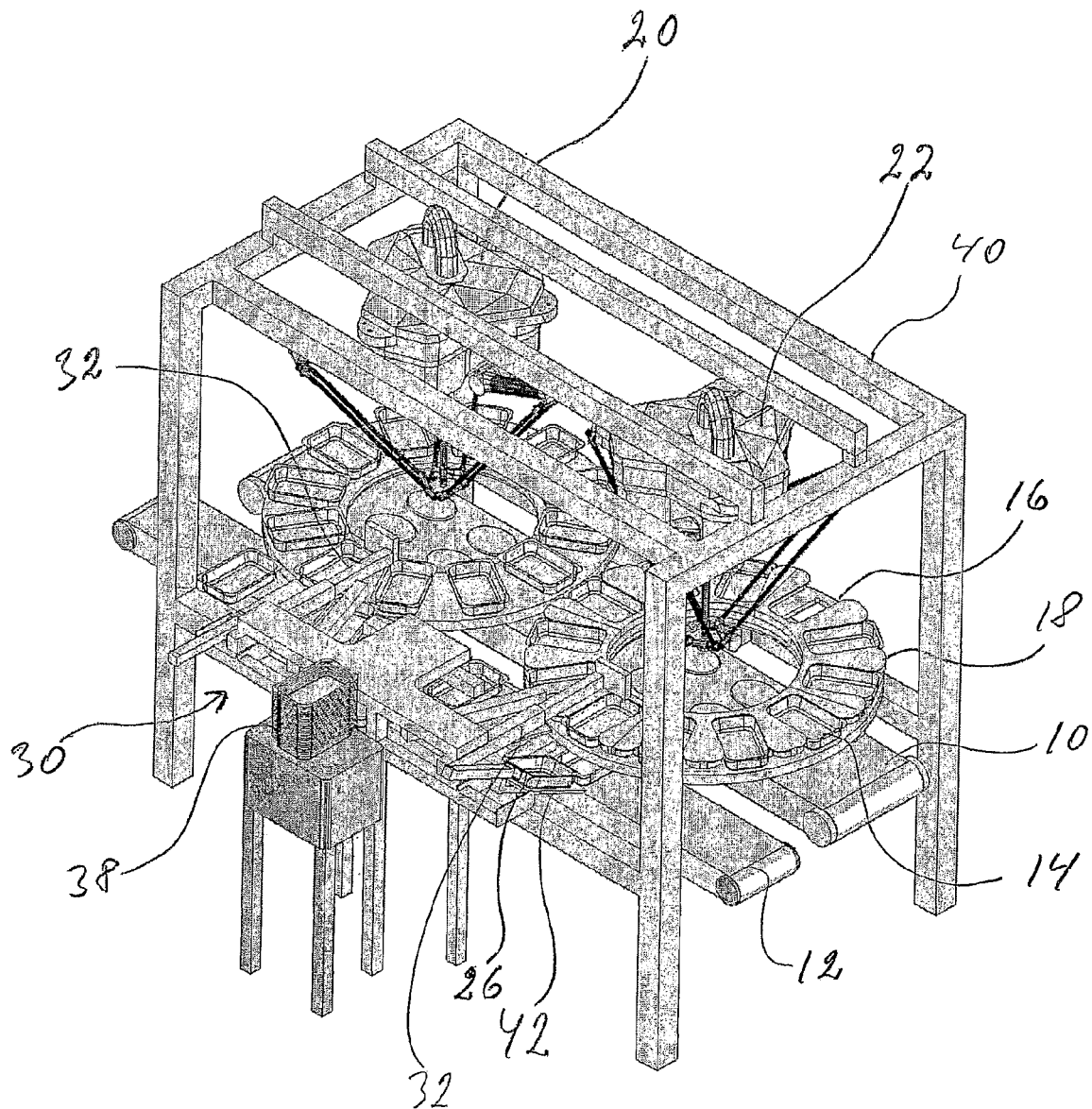
Figure 6:
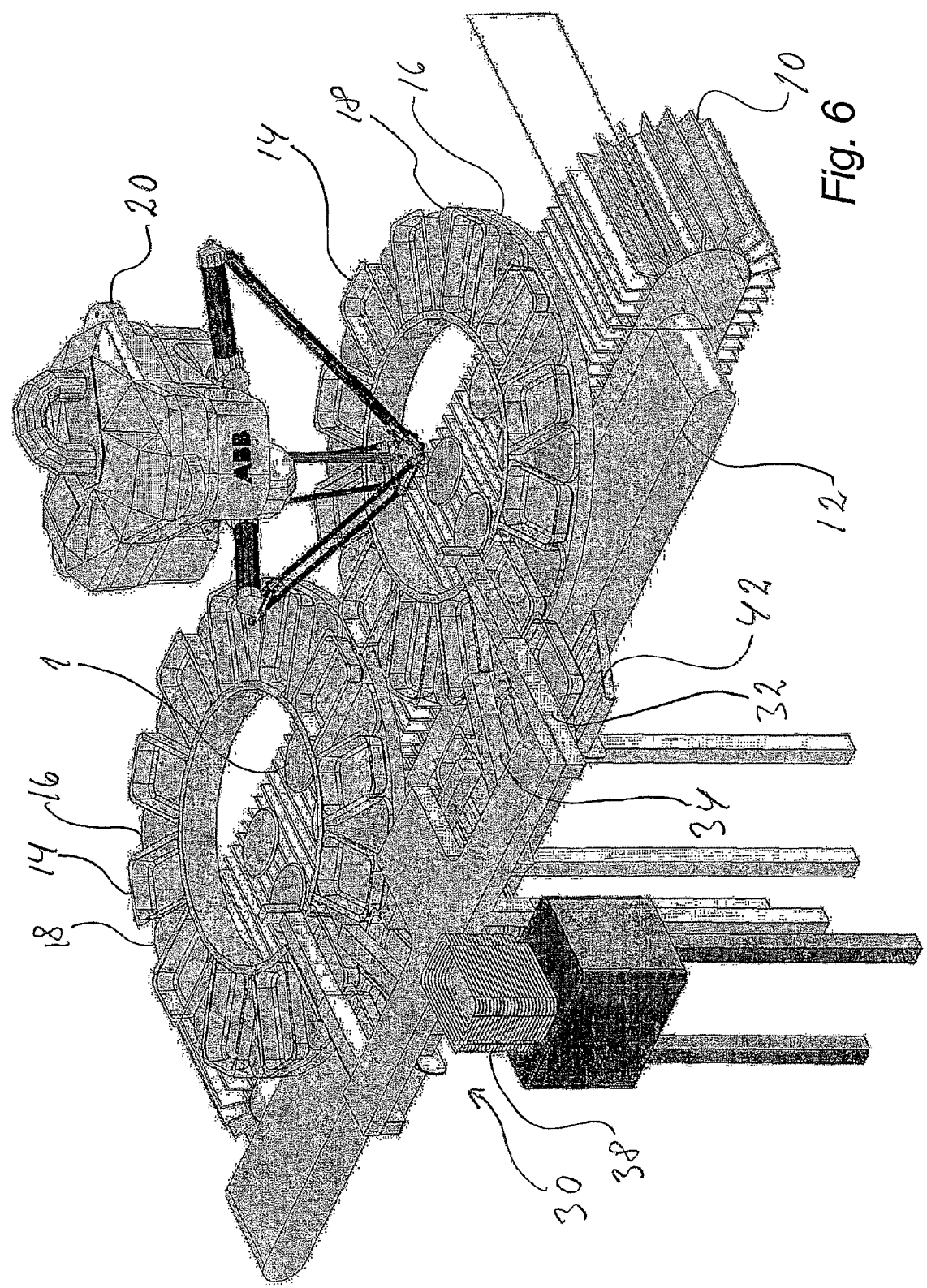
Figure 7:
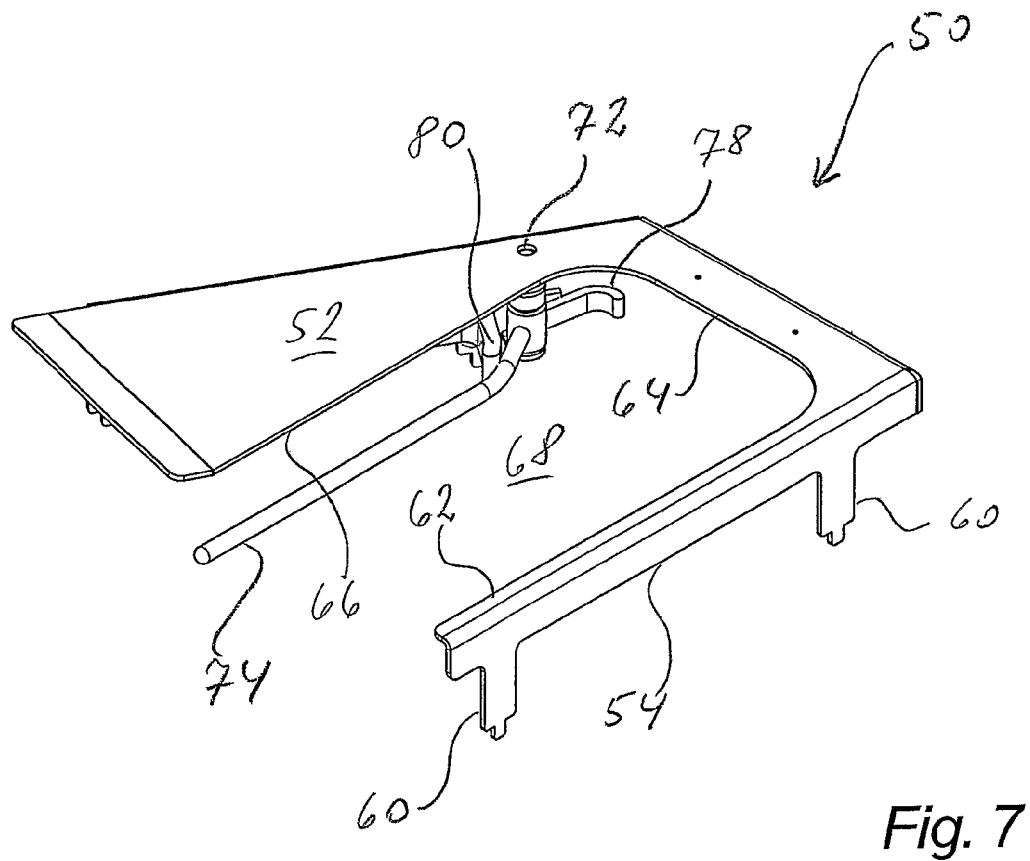
Figure 8:
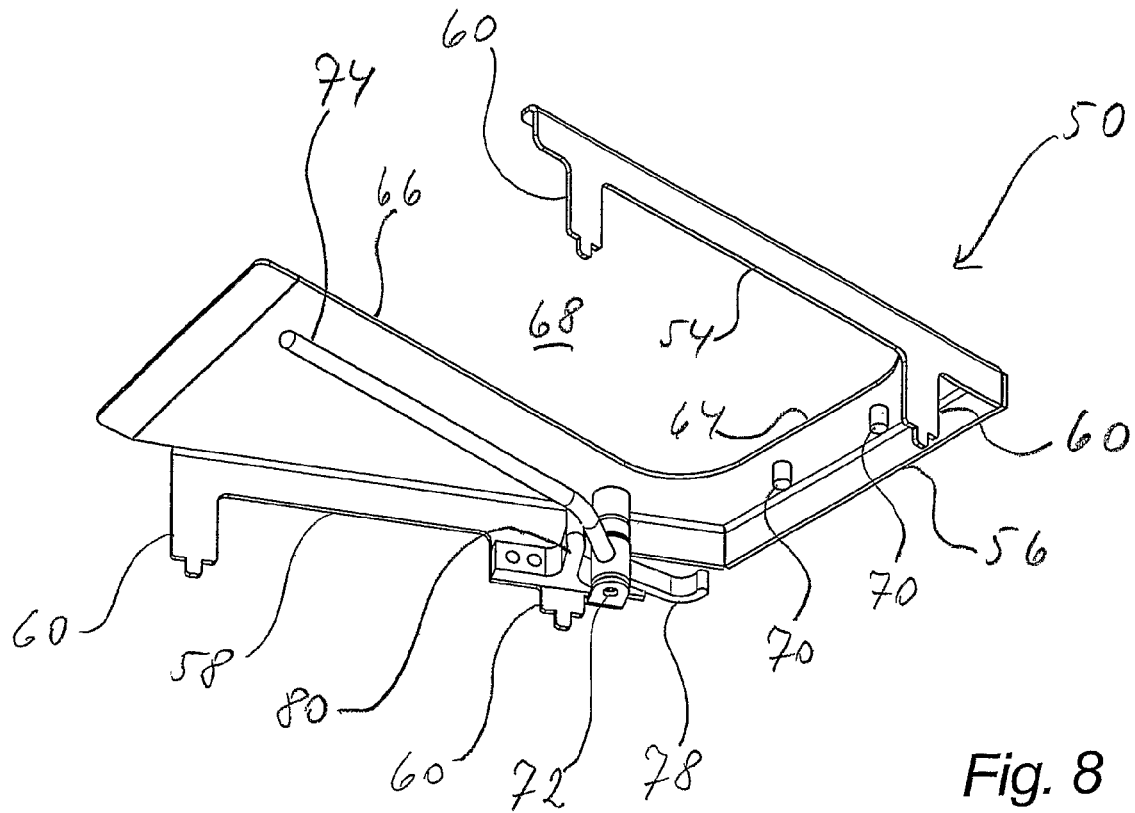
Figure 9:
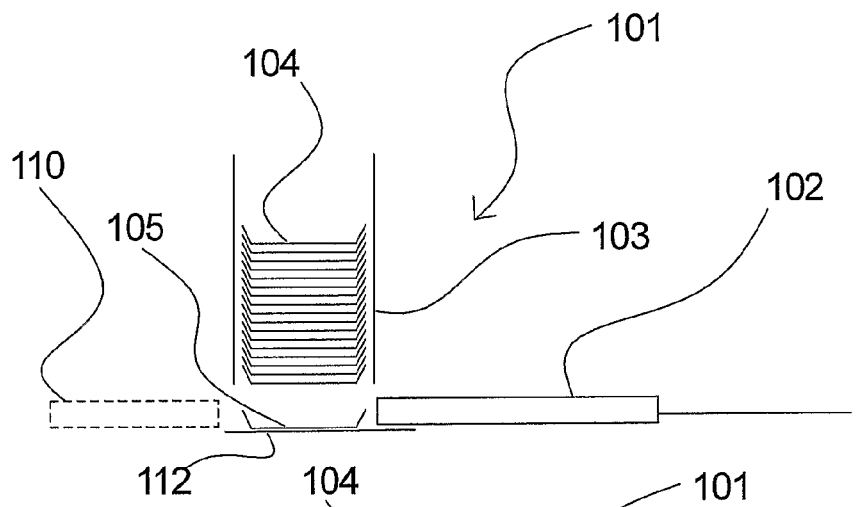
Figure 10:
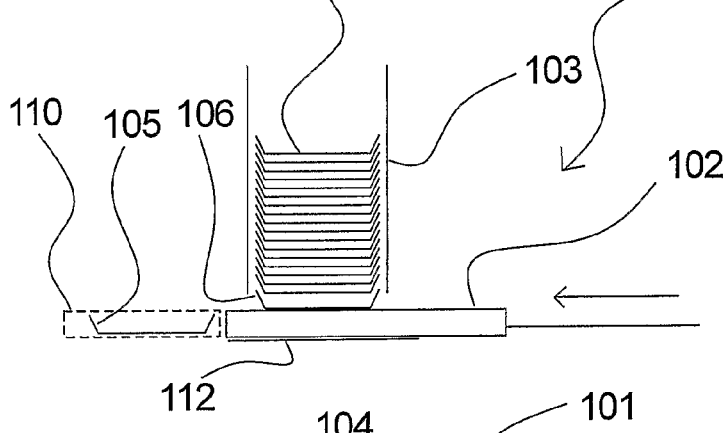
Figure 11:
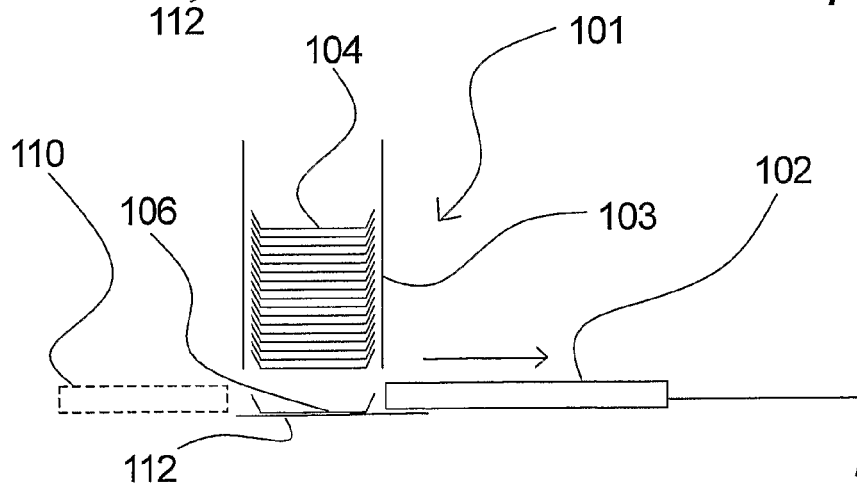
Figure 12:
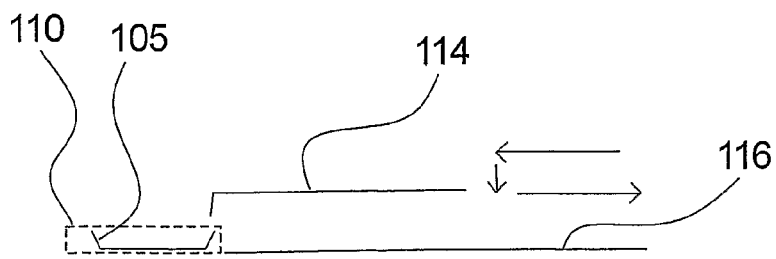
Figure 13:
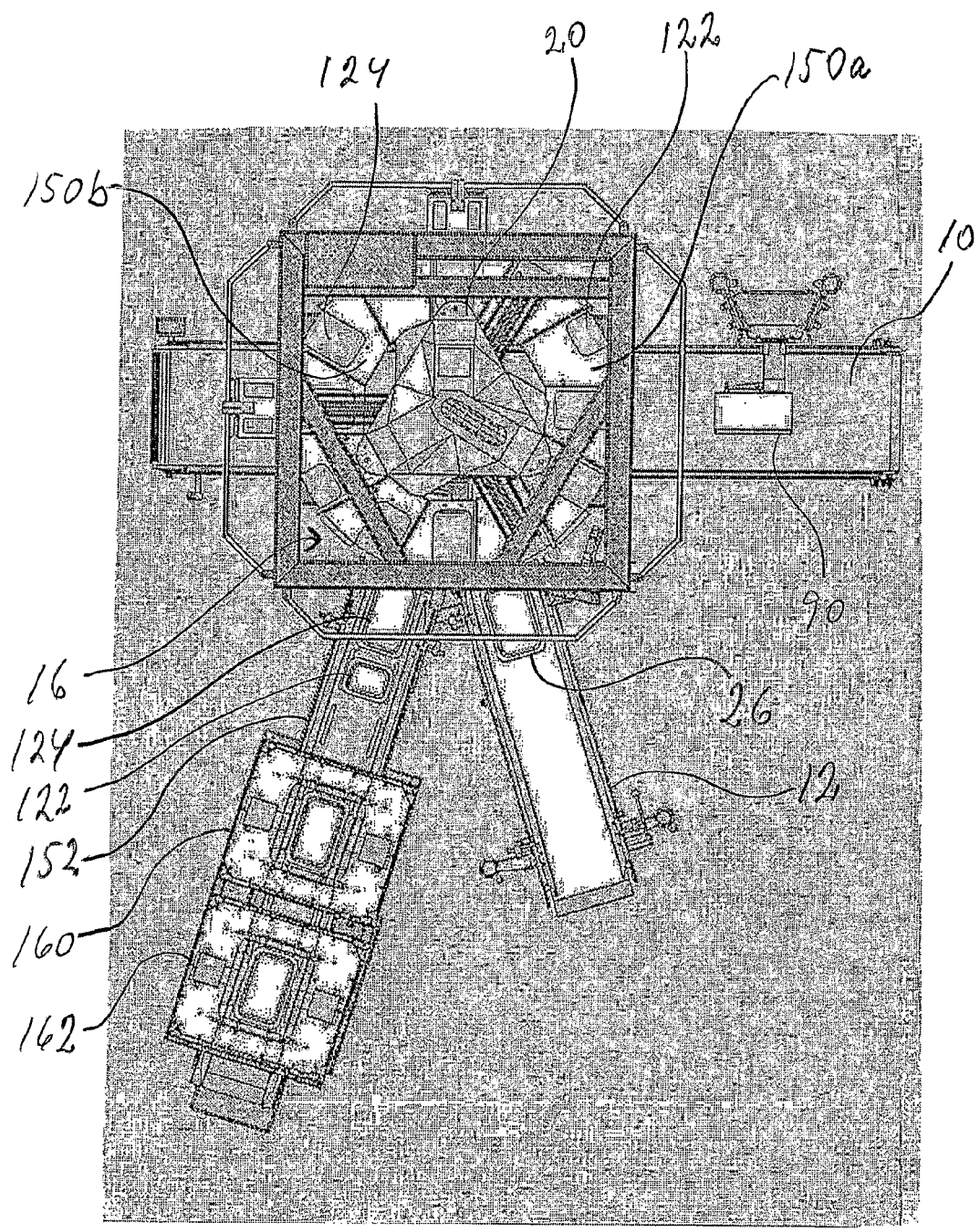
Figure 14:
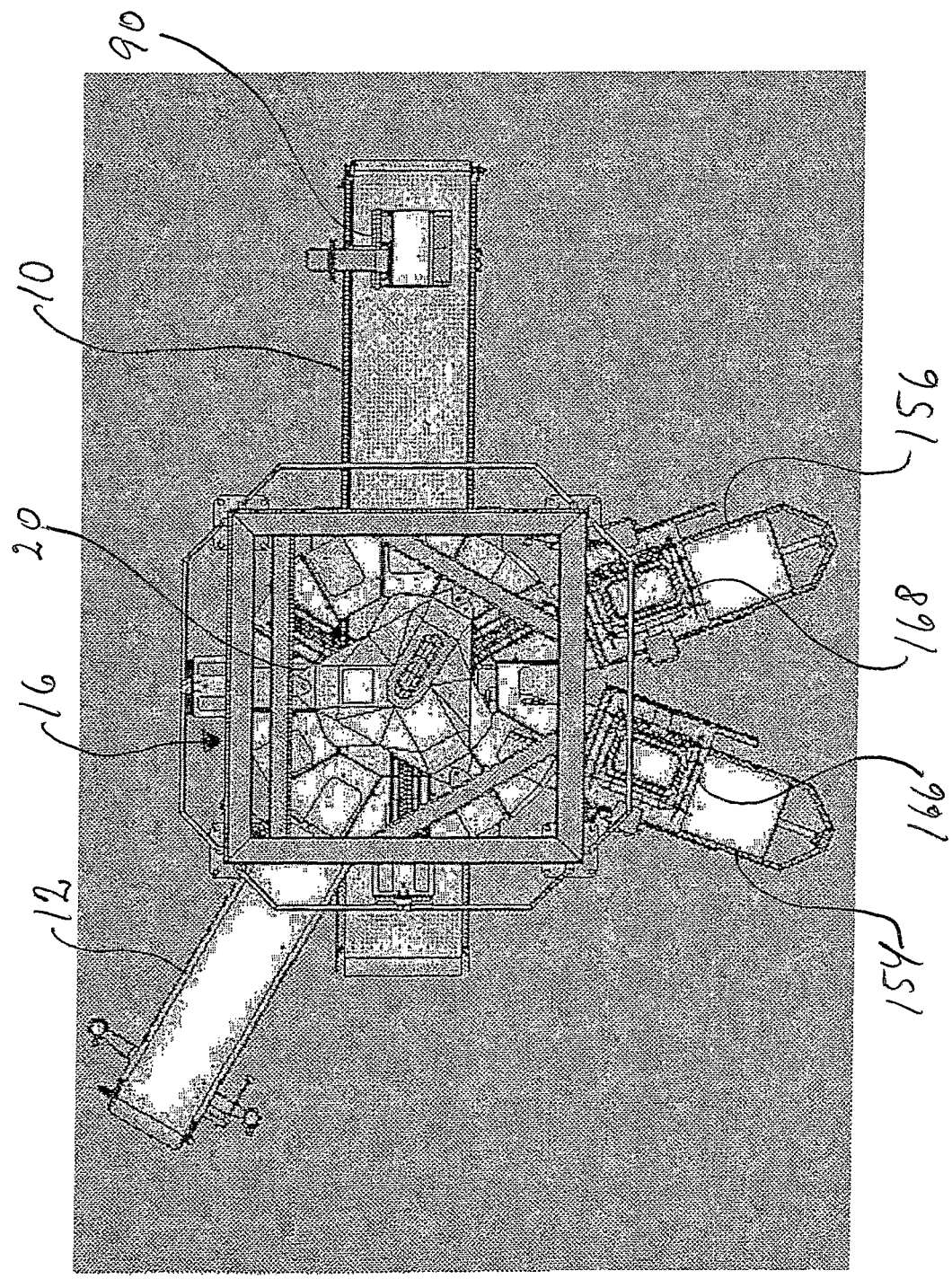

The invention will be explained in further detail below with reference to the figures of which FIG. 1 illustrates in a schematic manner a method and a system according to a first embodiment of the invention seen from above, FIG. 2 shows a particular embodiment of the invention seen from above, but with the robots removed, FIG. 3 corresponds to FIG. 2, but also showing the robots, FIG. 4 shows the embodiment shown in FIG. 3, seen from the side, FIG. 5 shows in a perspective view the embodiment shown in FIGS. 3 and 4, FIG. 6 shows in a perspective view a further embodiment of the invention, FIGS. 7 and 8 show locating and shielding means according to a further embodiment in perspective views, seen from above and below, respectively, FIG. 9 illustrates in a schematic view a tray denester and positioner according to a further aspect of the invention, seen from the side, FIGS. 10-11 illustrate in corresponding views the functioning of the tray denester and positioner shown in FIG. 9, FIG. 12 shows in a schematic view a further embodiment of a transfer device for completed batches, FIG. 13 shows a batching system comprising a supply or dispenser arrangement according to a further embodiment of the invention, seen from above, and FIG. 14 shows a batching system comprising a supply or dispenser arrangement according to a still further embodiment of the invention, seen from above.

DETAILED DESCRIPTION

A system for batching of objects in accordance with an embodiment of the invention is in general illustrated seen from above in FIG. 1. Here, the objects 1 are delivered by means of supply transportation equipment comprising two feeding conveyors 2 and 4, and the objects 1 are fed to weighing machines 6 and 8, by means of which the mass (or weight, as it will also be referred to herein) of the objects are determined. It is noted that the weight of the objects may be determined in other manners than by actual weighing, for example by measuring or determining the volume of each object and calculating the mass. The information regarding the individual masses are registered by means of e.g. a central control unit 92. As indicated, the central control unit 92 for the system receives in general a number of control input signals 94*a*-94*n* and is configured for transmitting a number of control output signals 96*a*-96*m* for controlling the various elements in and parts of the system, as it will be apparent to a skilled person. Further, it is noted that local control units can be comprised in the system.

When the weight or mass of the objects has been determined, they are transported further on by means for object transport 10 in the form of e.g. a conveyor belt. Here, a registration of the position and possibly the orientation and/or the type of the objects is performed by means of e.g. a vision system, scanning means or the like (not shown), and the information is registered by means of e.g. said central control unit. Thereby, the system will at any time know the position, the weight and possibly also the orientation and/or type of each object that has entered the means for object transport 10 and has been transported further on, for example based on the speed of the conveyor etc. The determination of the position etc., e.g. by means of scanning equipment, may take place earlier, e.g. prior to or simultaneously with the determination of the mass. However, this may lead to erroneous data concerning the position of the objects, since the position and/or orientation of the objects may change when they are transferred from one conveyor to the next, e.g. from a belt of the weighing machine 6 to the conveyor belt of the means for object transport 10. For example, an object may for a brief period be slowed down when passing the end gap between conveyors, thus resulting in the actual position of this object being slightly behind the position, which is e.g. calculated by a central control unit based on the speed of the conveyor(s), or an object may be shifted slightly sideward when passing the gap.

The means for object transport 10 may as shown be in the form of a single relatively wide conveyor belt, which for practical reasons may be preferable, but it will be understood that two or more separate conveyor belts placed alongside each other may be used as well.

The batching of the objects belonging to an assembly, for example an assembly of chicken parts with a predefined weight, is performed by placing the objects 1 on batching means 14 such as e.g. trays, packaging means or the like, which in the illustrated embodiment, as will be explained later on, are arranged for being moved around a pick-up area on the means for object transport 10, for example moved in a closed circuit that may be circular, semi- or pseudo-circular or the like. The batching means 14 may be moved while placed on carrier means 16 as illustrated that rotates around e.g. the pick-up area as illustrated, however, in FIG. 1 only for the robot 22. It is further noted that for the sake of clarity, only a few batching means 14 are illustrated on the carrier means 16. As it will be explained later on, the completed batches 26 are transferred from the carrier means and may be transported further on, e.g. for packaging, etc., by a take-away conveyor 12.

The objects 1 are moved from the means for object transport 10 to the batching means 14 using one or more handling means of the robot type or robots, as they will also be referred to in the following. When referring to robots or batching means of the robot type it will be understood that such robots are of a type having at least three degrees of freedom, for example meaning that the robots are operating in a effective operation area (i.e. in the X-Y-plane) and that the robots are designed for gripping or picking-up an object and placing it within the effective operation area (i.e. also operating in the Z-direction). Further, it is noted that the robots involved are of a type having e.g. a gripping or picking-up element for the lifting of objects or items and a controllable movement system for the transfer of a gripped or picked object or item selectively to a selected depositing position. These robots are controlled by the central control unit in order to batch the objects based on the information available to the system regarding e.g. the mass and position of the objects available for the batching, the mass of objects possibly already placed on the batching means 14 in unfinished batches and the desired parameters for the batches.

In FIG. 1, three such robots are used as illustrated by the effective area of operation for each of these, i.e. 20, 22 and 24, respectively. It is assumed that each robot will be able to operate within an essentially circular area, e.g. grip or pick-up an object 1 from the means for object transport 10 and place it on the batching means 14, e.g. trays that are moved around the pick-up area by the carrier means 16 (as illustrated in FIG. 1 only for the robot 22 and for the sake of clarity with only a few batching means 14 shown on the carrier means 16). It will be understood that other shapes of the effective operation area are possible, depending on the type of robot and/or the control equipment. Thus, the robots serve to selectively move objects from the means for object transport 10 and place them in batches on the batching means 14, possibly in an orderly form, for example in consideration of predetermined specifications and/or in order to achieve that the objects when placed in a packaging, possibly after being transferred from the conveyor 12, are presented in a nice and presentable manner.

When the batching means 14 are moved in an essentially circular loop, e.g. carried by a carrier 16, an optimal match will be gained with most types of robots, which in most cases will have an effective operative area that is essentially circular as well. Thus, a robot can be used which has an operative area corresponding virtually exactly to the size and form of the carrier 16, which is in contrast to prior art systems where a robot often must be used that is able to reach beyond most of the batching positions, but where one or more of the batching positions require such a capability, thus giving rise to the need for an "over-dimensioned" robot in these prior art systems.

Further, it is noted that the objects 1 shown with dotted lines in the figures are only exemplary in nature and that actual sizes, distances and/or orientations will vary as will the dimensions of the components, e.g. conveyors comprised in a system.

A particular embodiment of the invention will now be explained with reference to FIGS. 2 to 5, wherein a system is shown comprising two handling means of the robot type, but wherein the supply transportation equipment, weighing means, scanning means etc. are not shown.

As shown in FIG. 2, which shows a system for batching of supplied objects seen from above, but without the robots shown, the means for object transport, e.g. the conveyor 10, is located below two carrier means 16 for moving a number of batching means 14, e.g. trays, around respective pick-up areas, where for illustrative purposes four objects 1 are shown, ready to be selected by the robots and transported to a selected tray 14. It will be understood that the four objects that in FIG. 2 are shown located at the pick-up area for the robot 20 (to the left in FIG. 2) of course need not all be selected and transferred to batching means 14 located on the carrier 16 at this robot 20. Similarly, it will be understood that even though four objects similarly are shown located at the pick-up area for the robot 22 and assuming that the conveyor 10 moves to the right in FIG. 2, normally some of the objects will have been picked-up at the preceding pick-up area(s). As shown, each carrier means 16 may accommodate 12 trays, but it will be understood that fewer or more trays may be accommodated, depending for example on the size of the desired batches, the size of the objects, the type of robot etc. As shown, the carrier means 16 to the right in FIG. 2, i.e. the carrier means 16 allocated to the robot 22, may comprise a number of segments, for example four in total, of which only the two segments 16a and 16b will be referred to here for the sake of clarity, which segments will make up the complete circular carrier means. Thereby, a change of tray size, e.g. corresponding to a change of batch size and/or object size, may be effected relatively easily by exchanging the segments e.g. 16a, 16b with segments dedicated to the desired size. One segment may comprise one or more batching means. As shown, the carrier means 16 may have means 18, e.g. walls, ridges, elevations or the like for locating the individual trays, thereby ensuring that the robot can place the objects with accuracy in relation to the e.g. tray.

The carrier 16 may also be arranged in such a manner that it may be adapted to accommodate or support e.g. trays of different sizes and/or types. For example, the carrier may comprise a number of rings or ring-shaped elements that may be displaced in order to support trays of different sizes.

As explained above, the batching system allows the robots to select objects 1 and place these on or in selected batching means 14, while these batching means 14, e.g. trays, are being moved in a suitable distance from the robot, e.g. along a circular track as shown. This arrangement places no restraints on the time, in which a particular batch must be completed, i.e. since a tray may be allowed to remain in the circuit or loop around the robot as long as necessary in order to wait for one or more suitable objects to emerge, that will complete the batch in an optimal manner, e.g. with a minimum of give-away weight.

Further, the system comprises a transfer arrangement 30 for transferring completed batches and empty batching means 14, e.g. trays. As shown, such a transfer arrangement may be a common arrangement for both carrier means 16. In the following, the function of the transfer arrangement will be explained with reference to the carrier means 16 at the left in FIG. 2, i.e. the carrier means allocated to the robot 20. When a batching means 14 contains a completed batch, this batch will be removed from the carrier means 16 by means of a transfer device 32, e.g. a telescopic arm, when the batch is located in the appropriate position, controlled by the control system. The transfer device 32 may as indicated comprise an abutment, an arm or the like, which is normally located at the inner periphery of the carrier means and which is moved outwards, when a batch is removed from the carrier means 16. Later on, further embodiments of such a transfer device will be described. As it also will be explained later on, the completed batch will be transferred to the conveyor 12 for further transport, handling, packaging etc. As shown, the carrier means 16 may be arranged for moving in a counter clockwise direction, and the empty location on the carrier means will therefore after a short time be located in a position near a transfer device 34 for empty trays. Thus, a new tray, i.e. batching means 14 can be moved to the vacant location by means of this transfer device 34, which may also be a telescopic arm, controlled by the control system. The trays may be delivered from a supply 38, that may be common for both carrier means, and may be delivered via a buffer zone 36 for empty trays.

FIG. 3 corresponds to FIG. 2, but in FIG. 3 the robots 20 and 22 are also shown as well as a frame 40 supporting e.g. the robots and other parts of the system. The robots may be of a type readily available, for example as indicated robots supplied by Asea Brown-Boveri (ABB).

FIG. 4 shows the system in a lateral view, thus showing the configuration of the robots. However, other types of robots, i.e. handling means having at least three degrees of freedom, may be used as well.

FIG. 5 shows the system in a perspective view. Here, it may be seen how a completed batch can be transferred to the conveyor 12 for further transport after it has been removed from the carrier means 16 by the transfer device 32. As shown in FIG. 5 in connection with the carrier means to the right, i.e. corresponding to the robot 22, a completed batch 26, e.g. tray containing the selected objects, may be transported down to and onto the conveyor 12 via a chute 42 or the like. For example, a batching means 14 that contains a completed batch, may be transferred to a support, e.g. 42 located at essentially the same level as the carrier 16. The support 42 may afterwards be tilted downwards as shown in FIG. 5, whereby the tray with the completed batch is allowed to slide downwards and onto the conveyor 12. Other manners of transferring the completed batches to a take-away conveyor are obvious to the skilled person, for example by transferring a completed batch away from the carrier means 16 and transferring it directly to e.g. a take-away conveyor placed e.g. lateral of the carrier.

FIG. 6 shows in a perspective view a further embodiment of a system according to the invention. Features, which have already been explained above, will not be explained in further detail here. However, here the chute or the tiltable support 42 for guiding the competed batches down to the take-away conveyor 12 is seen clearly. The means for object transport 10, e.g. the conveyor from which the objects 1 are picked or grabbed, is according to this embodiment configured with a surface with elements, e.g. lamella or fins, which raise the objects from the basis of the conveyor, thereby allowing the objects to be gripped, e.g. lifted by means, for example fork- or finger-shaped elements that may be led under the objects.

As shown in FIG. 6, the e.g. lamella or fins may extend in the traverse direction of the conveyor, but it will be understood that instead they may extend in the longitudinal direction. Further, it will be understood that the means for object transport may be provided in the form of a conveyor belt comprising a plurality of parallel strings or cords, e.g. a polycord conveyor (e.g. a conveyor with several parallel running cords instead of a belt). In this respect it is noted in general that the robots may in accordance with the invention be equipped with different gripping or picking means, e.g. lifting, grabbing, suction means etc. that may be exchanged, for example in dependence on the type of objects.

In FIG. 6, only one robot 20 is shown for the sake of clarity, but it is apparent that a robot is allocated to each of the carrier means 16.

In the examples described above, two or three robots have been used, but the system may comprise only one robot and more than three robots may be used as well. Further, it is submitted that when a plurality of robots and corresponding carrier means are used, batches of different sizes and/or types may be assembled at the respective carrier means, and the carrier means may as also described above be equipped with differently sized batching means 14, e.g. trays. Further, if different batches are completed, e.g. one size or type at one robot and a different size or type at another, these batches may readily be transported in such a manner that they can not be mixed, for example using two or more take-away conveyors 12.

In FIGS. 2 to 6, the embodiments of the system have been shown with a supply or dispenser arrangement for empty batching means, e.g. 38 that is shared by two carriers 16 and their corresponding robots. Apparently, such a supply or dispenser arrangement for empty batching means such as trays may also serve as a supply or a dispenser for more than two carriers and corresponding robots, e.g. three, four or more. However, a supply or dispenser arrangement may supply e.g. trays to only one carrier and a corresponding robot or to only some of the carriers and corresponding robots, in case a system comprises more than two carriers and corresponding robots. In general, each carrier and corresponding robot may have a separate supply or dispenser arrangement. It is also noted that the size and/or type of batching means 14, e.g. trays, may differ and that for example each supply or dispenser arrangement may serve to handle a specific size and/or type of tray. Furthermore, it is noted that more than one supply or dispenser arrangement may be allocated to a carrier and a corresponding robot, and that for example each arrangement may handle different sizes of trays. If for example the embodiment shown in FIG. 2 is considered, it is apparent that it may be modified to comprise two separate tray dispensers or supplies, one allocated to the robot 20 and the other one allocated to the robot 22. Further, it is apparent that the dispensers may supply different sizes of trays, for example a large size to the robot 20 and a small size to the robot 22. However, one or both of these robots may be equipped with another dispenser, which for example may be placed at the other side of the carriers, e.g. in the upper part of FIG. 2, and that such another type of dispenser may supply another size tray than the first dispenser, for example in cases, where batches of different sizes are produced at one and the same robot, as it will be explained in further detail below. More than two, e.g. three, four etc. different dispenser arrangements may also be allocated to a carrier and corresponding robot, for example placed along the periphery of the carrier, thereby making it possible to deliver three or more different sizes and/or types of batching means 14 to a carrier/robot. It is also apparent that the embodiment shown in FIG. 2, which has a shared supply or dispenser arrangement, may be supplemented with a further shared supply or dispenser arrangement, placed on the other side of the carriers/robots, that is in the upper part of FIG. 2. Thus, one dispenser may for example supply large size trays, while the other one may for example supply small size trays. One dispenser may supply trays to one or both robots and the same applies to the other dispenser. It is apparent to a person skilled in the art that numerous other configurations and/or combinations are possible.

It is noted, though, as it has also been indicated above, that different sizes and/or types of batches may be produced at one and the same robot, for example in cases, where only one robot and one carrier is used. Here, different size batching means 14, e.g. trays, may be placed at different positions on the carrier 16, which positions are registered by the control system, whereby the robot can be controlled to transfer the selected objects or items to the relevant trays in order to complete the desired different batches. It will be understood that the system will register the position of each of the e.g. trays, as these are being moved around the robot. When different batching means, e.g. trays are used at one and the same carrier 16, and the carrier comprises a number of segments, e.g. 16a and 16b, the different sizes can be allocated to the different segments. But it will also be understood that the differently sized batching means can be placed on the carrier in random order as long as the control system registers the position, in which each of the e.g. trays are placed by the system.

Further, in the examples above, the objects have been shown delivered in two trails along each other on the means for object transport 10, but it is apparent that the objects can be delivered in any other suitable manner, for example in three or more trails or rows or in an irregular form.

When two or more robots 20, 22, 24 are used according to the invention, these are controlled by the system to cooperate in producing batches in an optimal manner, e.g. by producing batches that have a minimum of give-away weight and which in general fulfil the predetermined criteria in an optimal manner. Thus, a robot placed first in the direction of the flow of objects will not necessarily be controlled to grip a specific object when this object is in the pick-up area for the first robot, if it is determined by the control system that this specific object can complete a batch at e.g. the second robot in such a manner that e.g. the weight criterion will be fulfilled with a minimal overweight for this batch, and/or if it is recognized that another suitable object is on the way to the first robot and/or with great certainty can be expected to emerge within a predetermined time limit. Thus, it will be understood that the robots are controlled by the control system to operate together to achieve an optimal result, and that a system comprising a number of robots in general due to this cooperation will achieve better results than a system comprising only one robot.

Furthermore, it is noted that means may be provided for facilitating a cleaning of e.g. the tool located at the tip of the robot, e.g. a gripping, lifting or suction tool. For example, a spot may be designated essentially lateral of the conveyor 10 but inside the operative area for the robot, in particular if the carrier means is displaced in relation to the conveyor 10, where a cleaning tool may be located, whereby a regular cleaning may be performed, when the robot moves the tool to the cleaning spot. Further, the robot may have two similar tools and may change these tools, e.g. park one at the cleaning spot, whereby one may be cleaned while the other is used for the batching and vice versa.

A further particular advantageous embodiment of the invention will be described in the following with reference to FIGS. 7 and 8 that show locating and shielding means, which in general are designated 50, seen in a perspective view from above and below, respectively. These means 50 serve a number of purposes, which will be explained in the following, but in general they may take the place of the means 18 for locating batching means on a carrier 16 as shown in FIGS. 2-6.

As shown, the locating and shielding means 50 comprise a plate part 52 (cf. FIG. 7), which has substantially vertical side parts 54 and 58 and an end part 56. The side parts 54 and 58 are provided with a plurality of support and fixing means 60 for connecting the locating and shielding means 50 to the carrier means 16. The general shape of the plate part 52 is such that a plurality of these locating and shielding means 50 can be placed in a substantially circular or polygonal form on the carrier means 16. Thus, the plate part 52 has a smaller width at one end, e.g. at the end part 56, than at the other end, and the plate part 52 may be in the form of a segment.

The locating and shielding means 50 comprise an opening 68 in the plate part 52, essentially corresponding to the form of the part of a batching means 14, e.g. a tray, where transferred objects 1 are placed. As shown, this opening 68 is defined by rim parts 62, 64 and 66 in the plate part 52. The opening 68 as shown in FIGS. 7 and 8 is in the form of an incision, e.g. an opening that extends into the plate part 52 from the outer end, e.g. the end that is wider, but it will be understood that a rim part may also be located here, thereby making the opening 68 surrounded by rim parts on all sides.

As shown in FIG. 8, the locating and shielding means 50 comprise end stop means 70 placed at the lower side of the plate part 52 and in a predetermined distance from the edge of the rim part 64. These end stop means 70 may be in the form of one or more pins as shown in FIG. 8 or similar means having the same function as will be explained later on. Furthermore, the locating and shielding means 50 have a retainer arm 74, which as indicated may be located by a bearing tap 72 connected to the plate part 52.

The retainer arm 74 is pivotable and can be operated by means of a release mechanism 78, and the retainer arm 74 is influenced by spring means 80, cf. FIG. 8, as will be explained in the following.

As explained above, the locating and shielding means 50 can be used instead of the locating means 18 shown for example in FIG. 2. Thus, these means 50 are placed on the carrier means 16 with the openings 68 corresponding to the locations, where batching means such as trays 14 are placed. It will be understood that the locating and shielding means 50 can be used in the form shown in FIGS. 7 and 8, i.e. each adapted for accommodating one batching means, e.g. tray 14, or they can be connected to each other, for example corresponding to segments 16a and 16b shown in FIG. 2, each able to accommodate three or another number of batching means, e.g. trays 14.

The locating and shielding means 50 as shown in FIGS. 7 and 8 are designed for accommodating batching means, e.g. trays that are substantially rectangular, corresponding to the batching means, e.g. trays 14 shown for example in FIG. 2. When a batching means, e.g. a tray is transferred into the locating and shielding means 50, for example by means of a transfer arrangement 30, one side of the batching means, e.g. the tray will abut against the side part 54, the end of the batching means, e.g. the tray will abut against the end stop means 70 and the other side of the batching means, e.g. the tray will be held by means of the retainer arm 74. When a batching means, e.g. a tray is slid into the locating and shielding means 50, for example by means of a transfer arrangement 30, the retainer arm 74 may be turned towards the side part 58, for example by means of the release mechanism 78, e.g. an arm, that may be actuated by means of e.g. a cam or the like (not shown in FIGS. 7 and 8). When the batching means, e.g. tray 14 has been slid into the locating and shielding means 50, e.g. with one end against the end stop means 70, the release mechanism 78 is de-actuated, whereby the retainer arm 74, e.g. due to a spring effect or in another manner, is allowed to push against the batching means, e.g. tray, thereby also pushing the batching means, e.g. tray against the side part 54, whereby the batching means, e.g. tray is positioned in the batching position on the carrier means 16. The retainer arm 74 may be forced against the batching means, e.g. tray via the spring means 80 that may be in the form of a spring arm or the like, connected for example to the side part 58 as shown in FIG. 8 and being made of a flexible material such as rubber or similar materials.

It will thus be understood that the retainer arm 74 serves to position the batching means, e.g. the tray with the necessary accuracy and further, the retainer arm 74 serves to hold the batching means, e.g. the tray in this position when the carrier means 16 is moving around the pick-up area, e.g. keeping the batching means, e.g. the tray positioned abutting the end stop means 70 and the side part 54, also when the batching means, e.g. the tray 14 is influenced for example by the robot placing objects in/on it or when a centrifugal force is affecting the batching means due to the rotation of the carrier means 16. In this respect it is noted that a particular advantage of the invention resides in the fact that the batching means may be quickly transferred to the carrier mans 16, since the retainer arm 74 is turned away from its retaining position, allowing a batching means to be quickly and unhindered slid into the locating and shielding means 50. Further, it is noted that when using the invention, the batching means may quickly be transported around the pick-up area, for example when a batch has been completed and where it is of importance that this batch is quickly transferred from the carrier means and a new batching means, e.g. tray inserted in order to maintain full capacity. Thus, it will be understood that the batching means may be transported with a relatively high angular velocity, which may result in a relatively high centrifugal force acting on the batching means, e.g. trays, but that the batching means, e.g. trays will be retained in the predetermined positions due to the function of the retainer arm 74, but that in accordance with this embodiment it will still be possible to remove and insert batching means in a quick manner.

Thus, when a batch has been completed in/on the batching means, e.g. tray and when the carrier is positioned in the predetermined position near the transfer arrangement 30, the batching means, e.g. the tray, may readily be removed, e.g. pulled or pushed away from the carrier means 17, or the release mechanism 78 may possibly be actuated, e.g. by means of a cam or the like (not shown), whereby the retainer arm 74 is pivoted against the spring action of the spring means 80 away from the batching means, e.g. the tray with the completed batch, which now can be easily removed by means of the transfer arrangement 30 and an empty batching means, e.g. tray can easily be slid into the locating and shielding means 50 as also explained above.

A further advantage of the embodiment shown in FIGS. 7 and 8 resides in that the opening 68 can be dimensioned in such a manner that the rim parts, e.g. 62, 64 and 66 can cover the edges of e.g. a tray 14 that is used as batching means. When using an arrangement as shown in e.g. FIG. 2, the edges of the batching means, e.g. a tray 14, are freely accessible and when the batching takes place and objects are transferred to the batching means, e.g. the tray, the robot may place the object in such a manner that part of the object contacts the edge of the batching means, e.g. the tray before sliding into the tray. Since the method and the system according to the invention in particular relate to the batching of foodstuff items and since these items may have a moist or wet surface, the edges of the batching means, e.g. the tray may be moistened as well or otherwise contaminated. Further, during the handling of the objects, particles, fibres, fat, moist, e.g. drops, etc. may fall from the objects down on the edges of the batching means, e.g. the tray, thereby also resulting in a moistening and/or contamination of the edges. This is in many instances undesirable, for example when the batching means, e.g. the trays are packaged using lids, foil or the like that are connected to the edge parts of the batching means, e.g. the tray, for example by welding, gluing, moulding etc., since the moist, fat, etc. may result in a less than optimal packaging. Thus, by the embodiment of the invention exemplified in FIGS. 7 and 8, an improved packaging process can be achieved since the edges of the batching means, e.g. the tray will here be covered during the batching.

It is noted, though, that the segments e.g. 16*a* and 16*b* described in connection with for example FIGS. 2, 3, 5 and 6 can also be designed with edges that will cover the edges of e.g. a tray, when it is placed at the carrier means 16, whereby the above-mentioned desirable effect will also be achieved with these embodiments.

It will be understood that the locating and shielding means 50 may be designed in different sizes, e.g. with differently sized openings 68, and that the locating and shielding means 50 may be exchanged and that different sizes may be used together on a carrier 16, corresponding to what has been explained above in connection with the other embodiments of the invention, e.g. in order to be able to complete batches of different sizes at one and the same carrier 16.

Thus, it will be seen that the locating and shielding means 50 may be analogous with the segments e.g. 16*a* and 16*b* described in connection with for example FIGS. 2, 3, 5 and 6, when these are designed for accommodating a single batching means, e.g. a tray.

A transfer device for empty batching means, e.g. trays, may according to a particular aspect of the invention comprise a tray denester and positioner, which will be described in further detail with reference to FIGS. 9-11. In this respect it is noted that for the purpose of this application the terms "tray loader", "tray dispenser" and "tray denester" will be used for similar arrangements by means of which trays can be provided one by one from a stack, a magazine or a storage of trays. FIGS. 9-11 illustrate in schematic views the sequential operation of the tray denester and positioner 101 or the apparatus for dispensing and positioning/placing/pushing packing or supporting elements, as it also will be referred to herein.

It is noted that when reference is made to trays or the like, it will be understood that packing or supporting elements are concerned that may take a wide variety of shapes and may be used for a wide variety of applications, such as for example in connection with batching of a wide variety of items or in connection with packaging, handling, etc. of items, material, etc. in general.

The tray denester and positioner 101 shown in FIGS. 9-11 comprises a storage or magazine 103 for accommodating a supply 104 of trays or the like, which are located a distance above a horizontal support 112, said distance corresponding to the necessary height for the correct function of the ejector means, that will be described below.

The tray denester and positioner 101 is placed next to a device, to which the trays have to be transferred, for example a system for batching as described above or in general a conveyor belt or analogous means, which serve to support and/or transport the trays while one or more items are being placed on each of a number of trays. As shown in FIG. 9, a compartment or location 110 for placing a tray is shown, for example a vacant place on a conveyor belt, a designated location on a carrier such as a revolving turntable or the like. It will be understood that the tray dispenser serves to transfer a tray to such a compartment or location 110, preferably as soon as such a compartment or location 110 is vacant, i.e. as soon as a tray which has received the intended item(s) is removed and the compartment or location 110 is next to the tray denester and positioner 101. It will thus be seen that it is desirable that the dispenser will be able to transfer a tray quickly and preferably while the compartment or location is moving.

The tray denester and positioner 101 comprises ejector means 102 that are designed for reciprocating between a position as shown in FIG. 9, e.g. a waiting position, and a position as shown in FIG. 10, where it has pushed a tray 105 into or onto the compartment or location 110 of the device.

As shown in FIG. 9, a tray 105 has been fed from the supply 104 to an initial position below the supply 104, resting on a support 112, and the rest of the trays in the supply 104 are withheld in the storage or magazine 103 in a manner, which is commonly used in this field, for example by means of a release mechanism (not shown), which serves to feed one tray at a time.

When an empty compartment or location 110 is next to the tray dispenser 101, the ejector means 102 are activated for transferring the tray 105 to the compartment or location 110 as shown in FIG. 10. A subsequent tray 106 in the supply 104 is released, for example by the above-mentioned release mechanism, which may take place as soon as the ejector means 102 have been moved so far to the left that the subsequently released tray 106 is prevented from falling down in front of the ejector means, but the subsequent tray 106 may instead be released after the ejector means 102 have initiated the return to the waiting position. However, the subsequent tray 106 is released in time for it to fall down to rest in front of the ejector means 102, before the ejector means are initiated for transferring the tray 106 to a new vacant location or compartment 110.

In FIG. 11 the tray dispenser is shown, where the ejector means 102 has been moved back to the waiting position and a subsequent tray 106 has been fed to the initial position, ready to be transferred to an operative position, e.g. located in a compartment 110.

As shown in FIG. 10, a subsequently released tray 106 may fall down on top of the ejector means 102 (or part hereof), while the ejector means slide under the tray 106. As explained above, when the ejector means have been moved sufficiently to the right as shown in FIG. 11, the tray 106 falls down, ready to be transferred.

It will be understood that a tray denester and positioner according to this aspect of the invention has the advantage that the trays can be transferred to the operative position in a quick and efficient manner since it can be ensured that a tray will always be ready for being transferred as soon as the ejector means have returned to the waiting position. Furthermore, the ejector means ensure that the tray can be located precisely at the intended location or compartment.

As mentioned, such a tray denester and positioner may be used in connection with various embodiments of the batching system and/or method as described herein.

In connection with FIGS. 2 and 3 it has been described that a completed batch on/in a batching means 14 can be removed from the carrier means 16 by means of a transfer device 32, which is illustrated as having an arm that pushes the completed batch out of and away from the carrier means 16, e.g.

pushing on the end part of the batching means facing the centre of the carrier means 16. Instead, as shown in FIG. 12, such a transfer device can comprise an arm 114, which is designed for interacting with the inner part of the rim or edge of the batching means, e.g. the tray 105. Thus, as schematically shown, the arm 114 may be designed with a part, for example the end part, which is suitable for engaging inside the batching means, e.g. the tray 105. As illustrated with the arrows in FIG. 12, when a tray 105 with a completed batch is located at the transfer position, the arm 114 can be moved towards the tray 105, lowered and pulled backwards, whereby the tray 105 will be transferred from the location or compartment 110 on the carrier means to for example a take-away conveyor 116. It will be understood that such an arm 114 can be designed in numerous manners and that it can be controlled in various manners, e.g. moved in a translatory motion and/or pivotal motion, etc. It will further be understood that the location or compartment 110 shown in FIGS. 9-12 can be located on carrier means 16 as shown in FIGS. 1-6 and that the locations or compartments 110 can form part of these carrier means 16 or be designed to be placed hereon.

In FIG. 13 a batching system comprising a supply or dispenser arrangement according to a further embodiment of the invention is shown, seen from above. Here, a handling means of the robot type, e.g. a robot 20, is shown, corresponding to the handlings means 20, 22 and 24 described above, and therefore further details of this robot 20 will not be described here. The robot 20 is arranged for selectively picking or gripping objects from a means for object transport, e.g. a conveyor 10, and further a vision system, scanning means or the like 90 is shown for determining e.g. the position, the orientation, the volume, the colour etc. of objects being transported to the pick-up area in correspondence with what has been described above.

Furthermore, a carrier means 16 is shown, which as illustrated is designed for carrying batching means, e.g. trays of different sizes, e.g. trays with a larger size 124 arranged in a locating and shielding means 150*b* and trays with a smaller size 122 arranged in a locating and shielding means 150*a*. It will be apparent that more than two different sizes can be utilized. According to this embodiment, these trays 122, 124 are delivered to the carrier means 16 by means of a tray feeding conveyor 152 leading to the carrier means 16. At the start of this tray feeding conveyor 152 two tray dispensers 160 and 162 are placed, each one having a supply of trays, e.g. smaller trays 122 at the dispenser 160 and larger trays 124 at the dispenser 162. The trays are dispensed to the tray feeding conveyor 152 in the order, in which they have to be transferred to the carrier means 16, e.g. in an order determined by the central control means (not shown) and in consideration of e.g. which batches are completed or will be completed at the carrier means 16. At the tray feeding conveyor 152 means, for example pawls or the like, may be arranged for keeping the trays mutually spaced and/or for blocking the advance of the trays, e.g. when the conveyor 152 is moving. Further, sensors may be provided in order to detect when a space on the conveyor is empty, whereby a subsequent tray can be allowed to move forward a step, e.g. by releasing a pawl holding it back.

Further, in FIG. 13 a means for batch transport or take-away conveyor 12 is shown for the completed batches 26, which may be transferred to the take-away conveyor 12 by means of for example an arrangement as shown in FIG. 12 or an arrangement as described in connection with FIGS. 2 and 3. It will be understood that with the arrangement shown in FIG. 13 the carrier means 16 will preferably be arranged for moving in a clockwise direction, whereby a completed batch 26 will be transferred from the carrier means, leaving an empty space for a batching means or tray 122 or 124, and whereby the carrier means 16 immediately afterwards will be turned sufficiently for this empty space to be located in alignment with the tray feeding conveyor 152, whereby a tray can be transferred to the empty space, ready to take part in the batching process. Thus, it will be seen that an efficient use of the machinery is achieved.

In FIG. 14 a batching system comprising a supply or dispenser arrangement according to a still further embodiment of the invention, seen from above, is shown in a manner similar to FIG. 13. Therefore, details already mentioned will not be dealt with again. As shown, the carrier means are also here adapted for carrying trays of different sizes, for example two different sizes.

It will be understood that the arrangements shown in FIGS. 13 and 14 may comprise only one robot 20 each or that a number of robots, e.g. two, three or more may be used for batching objects from the means for object transport, e.g. the conveyor 10.

Means for batch transport, e.g. a take-away conveyor 12 that may be designed as described above in connection with FIG. 13, is shown, and further two tray denesters and positioners 166 and 168 are used, each one for example supplying trays of a specific size, or they may both supply trays of the same size. More than two tray denesters and positioners 166 and 168 may be used at each robot. These tray denesters and positioners 166 and 168 may be designed as explained in connection with FIGS. 9-11, and as shown they may be located next to each other and in such a manner that trays are delivered direct to the individual empty locations on the carrier means 16, transferred and positioned by means of the ejector means 154 and 156, respectively.

In connection with the above-mentioned various arrangements for transferring empty batching means, e.g. trays to the carrier means, it is noted that means, e.g. sensors etc. may be provided for detecting whether a location or compartment on/at/in the carrier means is empty, whereby it can be detected if accidentally a tray has not been transferred or not been transferred correctly to the carrier means. In such a case the system can be advised not to place any objects at the particular location, or preferably, a tray may be transferred to the particular location. This can for example take place, when two or more tray suppliers or tray denesters and positioners 166 and 168 are used as shown in FIG. 14, where, if a tray has not been successfully transferred using the tray denester and positioner 166, a tray can be transferred using the other tray denester and positioner 168 (assuming that the carrier means 16 are rotated counter clockwise in FIG. 14 and vice versa, if it is rotated clockwise).

The above-mentioned control unit, which as mentioned is connected to the vision- or scanning system, comprises precise information regarding the position/location, orientation and possibly also type of the objects, whereby it is possible for it to control the robots to move the objects, e.g. lift the objects and place them on the batching means, including changing the orientation of the objects if necessary. Further, the control unit is connected to the weighing means or the means for determining the mass in other manners, whereby it also comprises weight information relating to each of the objects.

This control unit may be provided with software facilitating a selection of objects, which constitutes an optimal choice in consideration of the chosen package-operation. Such software may for example be software operating in accordance with the operating rules described in EP 781 172 or WO 01/22043. Thus, the batching may be performed in accordance with the so-called accumulation principle, i.e. by selecting and placing the objects in accordance with their weight and the weight of the objects already placed or selected (to be placed), or in accordance with the so-called combination principle, i.e. by selecting the object for a batch as a combination of items available for the selection, e.g. the objects present on the means for object transport 10. Other principles or combinations hereof may be used as well.

Further, it is mentioned that the weight or mass of the objects may be determined in other manners than by weighing as also indicated above. For example, a determination of the weight may be effected using vision equipment, possibly simultaneously with the scanning of the objects that take place in order to determine the position, the orientation and possibly also the type of the objects. Other means and methods for determining the mass of the objects may also be utilized, which will be comprised by the patent claims.

As regards the handling means of the robot type, e.g. the robots, which they simply also has been referred to as being in the above, it will be apparent to a skilled person that various types and makes may be used in connection with the present invention. Essentially, the handling means of the robot type may comprise means for selectively gripping, picking, lifting or in general handling the objects, controlled by the control means, and further, they may be configured for controllably moving the objects to a desired location, also controlled by the control means, for example by moving the object to the location and dropping/releasing the object, possibly after having oriented the object, or for example by throwing the object to the desired location. It will be apparent to the skilled person that various robot arrangements may be used within the scope of the claims.

Furthermore, it is noted that the carrier or carriers for the batching means may be moved continuously or non-continously, for example in steps. Further, it will be understood that the speed with which they move, may be constant or it may vary, controlled by e.g. the central control means. Even further, it will be understood that the direction of rotation may always be the same or that the direction of rotation may change.

LIST OF REFERENCES

1 Objects
2, 4 Feeding conveyors
6, 8 Weighing machines
10 Means for object transport, conveyor
12 Means for batch transport
14 Batching means, trays or the like
16 Carrier means
16*a*, 16*b* Segments of carrier means
18 Means for locating individual batching means, e.g. trays on the carrier means
20, 22, 24 Handling means of the robot type
26 Completed batches
30 Transfer arrangement for batches and batching means
32 Transfer device for batches
34 Transfer device for empty batching means
36 Buffer zone for batching means
38 Supply of batching means, e.g. trays
40 Frame
42 Chute or tiltable support for completed batches
50 Locating and shielding means for batching means 14
52 Plate part of locating and shielding means 50
54, 58 Side parts
56 End part
60 Support and fixing means
62, 64, 66 Rim parts
68 Opening in plate part 52
70 End stop means
72 Bearing tap
74 Retainer arm
78 Release mechanism
80 Spring means
90 Vision system, scanning means or the like
92 Central control unit
94*a-n* Control input signals
96*a-m* Control output signals
101 Tray denester and positioner
102 Ejector means
103 Storage or magazine
104 Supply of trays
105, 106 Trays or batching means in general
110 Compartment or location for tray
112 Horizontal support
114 Transfer device arm
116 Take-away conveyor
122 Smaller tray
124 Larger tray
150*a*, 150*b* Locating and shielding means for trays
152 Tray feeding conveyor
152, 154 Ejector means
160, 162 Tray dispensers
166, 168 Tray denesters and positioners

The invention claimed is:

1. A method of batching supplied objects in batches in such a manner that a batch fulfills predefined criteria of total weight range, said method comprising the steps of:
    determining the weight of each one of said objects;
    transporting the objects by means for object transport toward a rotating carrier;
    selectively gripping or picking up a selected one of the objects from said means for object transport for placing at a selected position on said rotating carrier by means of one or more robotic handling means, said selected position being chosen to form a batch of objects on said rotating carrier in consideration of said predefined criteria and the determined weight of the selected one of said objects;
    rotating said batch of objects in a plane using said rotating carrier; and
    transporting said batches away from said rotating carrier using means for further transport.

2. The method according to claim 1, whereby each batch further fulfills a predetermined criteria of one or more of the number of objects, object weight, object orientation and/or object type.

3. The method according to claim 1, whereby batching means are arranged in such a manner that a number of batching means move around each of said one or more robotic handling means on said rotating carrier, said number of batching means arranged on said rotating carrier, which rotating carrier is designed for carrying said number of batching means and arranged for turning said number of batching means in a closed loop, while the batches are being produced for placing in said number of batching means.

4. The method according to claim 1, whereby said batches are formed in trays arranged on said rotating carrier.

5. The method according to claim 4, whereby one of said trays is transferred, when the one of said trays holds a batch that is completed, to said means for transporting said batches away from said rotating carrier, and whereby an empty tray is transferred to said rotating carrier after the completed batch has been removed.

6. The method according to claim 1, whereby batching means are used for holding said objects forming said batches, and said batching means are continuously moved around said one or more robotic handling means on said rotating carrier during the batching process.

7. The method according to claim 1, whereby batching means are used for holding said objects forming said batches, and said batching means are moved non-continuously around said one or more robotic handling means on said rotating carrier during the batching process.

8. The method according to claim 4, whereby trays are supplied using a method comprising the steps of:
- feeding one of said trays to an initial position from a supply of trays;
- transferring said one of said trays from said initial position to an operative position using ejector means; and
- returning said ejector means to a waiting position whereby a subsequently released another one of said trays enters said initial position.

9. The method according to claim 1, whereby a batching means is moved around said one or more robotic handling means using said rotating carrier for more than one revolution while a batch of objects is produced on said batching means.

10. A system for batching supplied objects in batches in such a manner that a batch fulfills predefined criteria of total weight range, wherein the system comprises:
- a device for determining the individual weight of each one of said objects;
- a rotating carrier;
- a first conveyor for transporting said objects toward said rotating carrier;
- one or more robots for effecting a selective transferral of the objects from said first conveyor to said rotating carrier, said robots being designed for selectively gripping or picking up said objects and for depositing each one of said objects at a selected position on said rotating carrier in consideration of the individual weight determined for each one of said objects, whereby a batch of objects is produced in consideration of said predefined criteria, and
- wherein during production of said batches of objects, said objects are rotated in a plane around said one or more robots via said rotating carrier; and
- a second conveyor for transporting said batches of objects away from said rotating carrier.

11. The system according to claim 10, wherein each batch further fulfills a predetermined criteria of one or more of the number of objects, object weight, object orientation and/or object type.

12. The system according to claim 10, wherein said objects are arranged in such a manner on said rotating carrier that a number of said objects are moved around each of said one or more robots.

13. The system according to claim 10, wherein said batches are produced in trays on said rotating carrier.

14. The system according to claim 10, wherein batches are produced in trays that are arranged on said rotating carrier which is designed for carrying said trays.

15. The system according to claim 14, wherein one of a plurality of carriers is designated for each one of said one or more robots.

16. The system according to claim 10, wherein said system is configured for moving at least some of said objects around said one or more robotic handling means for more than one revolution, while a batch of objects is produced on said rotating carrier.

17. The system according to claim 14, wherein said rotating carrier comprises means for retaining said trays, and wherein said means for retaining said trays comprises a release mechanism.

18. The system according to claim 17, wherein said means for retaining said trays comprises a retainer arm that is influenced by spring means.

19. The system according to claim 14, wherein said rotating carrier comprises means for covering edge parts of said trays.

20. The system according to claim 13, wherein said second conveyor is designed for transferring one of said trays, when a batch is completed in said one of said trays, to means for further transport, handling or packaging.

21. The system according to 10, wherein said system comprises a plurality of said robots, and where batches of different sizes and/or types can be completed at each of said robots, respectively.

22. The method according to claim 1, wherein said rotating carrier rotates a plurality of trays each for containing one of said batches, and wherein said method further comprises the step of, when a batch is completed, transferring the one of said trays including the completed batch to said means for further transport for transport, handling and/or packaging.

23. The system according to claim 10, wherein said selected position on said rotating carrier is in a tray being rotated by said rotating carrier, and wherein, when a batch is completed, said system is adapted for transferring the one of said trays including the completed batch to said second conveyor for transport, handling and/or packaging.

* * * * *

UNITED STATES PATENT AND TRADEMARK OFFICE
CERTIFICATE OF CORRECTION

PATENT NO. : 8,158,895 B2
APPLICATION NO. : 12/300696
DATED : April 17, 2012
INVENTOR(S) : Henrik Grundtvig, Henrik F. Skyum and Bjorn Heide Pedersen It is certified that error appears in the above-identified patent and that said Letters Patent is hereby corrected as shown below:

Column 23, Line 43 "robots via said rotating carrier, and" should read
-- robots via said rotating carriers, and --

Signed and Sealed this
Thirty-first Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,158,895 B2
APPLICATION NO. : 12/300696
DATED : April 17, 2012
INVENTOR(S) : Henrik Grundtvig et al.

Page 1 of 1

It is certified that error appears in the above-identified patent and that said Letters Patent is hereby corrected as shown below:

This certificate supersedes certificate of correction issued July 31, 2012. The certificate is vacated since request was filed in error by patentee. The patent is reinstated to its originally-issued form.

In the Claims

Column 23, line 43, "robots via said rotating carriers, and" should be --robots via said rotating carrier--.

Signed and Sealed this
Thirteenth Day of August, 2013

Teresa Stanek Rea
*Acting Director of the United States Patent and Trademark Office*